US007317053B1

(12) United States Patent
Gelman et al.

(10) Patent No.: US 7,317,053 B1
(45) Date of Patent: Jan. 8, 2008

(54) COMPOSITIONS FOR IMPARTING DESIRED PROPERTIES TO MATERIALS

(75) Inventors: Robert A. Gelman, Newark, DE (US); Matthew B. Howle, Hockessin, DE (US); Andrea Keys, Bensalem, PA (US); William W. Maslanka, Landenburg, PA (US); Jeffrey I. Melzer, Lansdale, PA (US); Michael T. Raab, Langhorne, PA (US); Richard A. Stuhrke, Wilmington, DE (US); Robert G. Szewczyk, Wilmington, DE (US)

(73) Assignee: Hercules Incorporated, Wilmington, DE (US)

( * ) Notice: Subject to any disclaimer, the term of this patent is extended or adjusted under 35 U.S.C. 154(b) by 578 days.

(21) Appl. No.: 09/613,425

(22) Filed: Jul. 10, 2000

(51) Int. Cl.
*C08F 8/30* (2006.01)
*C08L 77/00* (2006.01)
*C08L 77/06* (2006.01)
*C08L 31/04* (2006.01)
*C08L 33/00* (2006.01)

(52) U.S. Cl. ............. 525/178; 525/181; 525/183; 525/185; 525/191; 525/329.4; 525/330.3; 525/331.5; 525/420; 525/514; 525/540; 106/14.34; 106/14.35; 106/14.41; 106/31.06; 428/141; 428/147; 428/423.1; 428/425.1; 524/514; 524/524; 524/527

(58) Field of Classification Search ............. 428/423.1, 428/425.1, 425.8, 373, 342, 141, 147; 525/420, 525/421, 509, 514, 178, 181, 183, 185, 191, 525/329.7, 330.3, 331.5, 540; 427/487, 505, 427/507, 207.1, 340, 342, 384; 106/14.34, 106/14.35, 14.41, 31.06; 524/514, 502, 503, 524/517, 519, 521, 522, 523, 524, 527
See application file for complete search history.

(56) References Cited

U.S. PATENT DOCUMENTS

| 2,633,139 | A | 3/1953 | Pettey |
| 2,746,460 | A | 5/1956 | Jellinek |
| 2,764,166 | A | 9/1956 | Bogolowsky |
| 2,926,116 | A | 2/1960 | Keim |
| 2,926,154 | A | 2/1960 | Keim |
| 2,941,535 | A | 6/1960 | Lappe |
| 2,979,061 | A | 4/1961 | Greenman |
| 3,037,514 | A | 6/1962 | Lappe |
| 3,157,912 | A | 11/1964 | Lisczawka |
| 3,277,900 | A | 10/1966 | Lappe |
| 3,425,426 | A | 2/1969 | Welanetz |
| 3,483,289 | A | 12/1969 | Michaelson et al. |
| 3,487,831 | A | 1/1970 | Jaume et al. |
| 3,552,401 | A | 1/1971 | Michaelson |
| 3,714,298 | A | 1/1973 | Bergomi, Jr. |
| 4,049,607 | A | 9/1977 | Berghoff |
| 4,104,333 | A | 8/1978 | Lee, Jr. et al. |
| 4,106,614 | A | 8/1978 | Aylott |
| 4,229,431 | A | 10/1980 | Lee, Jr. et al. |
| 4,240,450 | A | 12/1980 | Grollier et al. |
| 4,260,701 | A | 4/1981 | Lee, Jr. |
| 4,323,490 | A | 4/1982 | Topfl |
| 4,381,294 | A | 4/1983 | Bouillon et al. |
| 4,420,530 | A | 12/1983 | Toyoda et al. |
| 4,501,640 | A | 2/1985 | Soerens |
| 4,522,686 | A | 6/1985 | Dumas |
| 4,571,412 | A | 2/1986 | Minamide et al. |
| 4,594,108 | A | 6/1986 | Greminger, Jr. et al. |
| 4,626,428 | A | 12/1986 | Weisberg et al. |
| 4,669,491 | A | 6/1987 | Weisberg et al. |
| 4,673,702 | A | 6/1987 | Iacoviello |
| 4,702,947 | A | 10/1987 | Pall et al. |
| 4,708,866 | A | 11/1987 | Turco et al. |
| 4,710,374 | A | 12/1987 | Grollier et al. |
| 4,718,957 | A | 1/1988 | Sensebrenner |
| 4,789,430 | A | 12/1988 | Fredeneucci |
| 4,816,073 | A | 3/1989 | Helmer |
| 4,841,008 | A | 6/1989 | Tsukamoto |
| 4,859,527 | A | 8/1989 | DiStefano |
| 4,871,534 | A | 10/1989 | Montgomery |
| 4,962,141 | A | 10/1990 | Iacoviello et al. |
| 4,963,603 | A | 10/1990 | Felegi, Jr. et al. |
| 5,109,053 | A | 4/1992 | Smith et al. |
| 5,120,259 | A | 6/1992 | Nakata et al. |

(Continued)

FOREIGN PATENT DOCUMENTS

| CA | 2117318 | 12/1994 |
| EP | 0579081 | 1/1994 |
| EP | 0606005 | 7/1994 |
| EP | 666368 | 8/1998 |
| WO | 99/14278 | 3/1999 |

OTHER PUBLICATIONS

B. Albert, "Formulating Nail Lacquer," *Drug and Cosmetic Industry*, p. 48 (1) (Nov. 1998).
R. A. Bankert, H.H. Espy, M. Grassie, and G.L. Schertz, "The Development of New Polyamide Resins for Easy-to-Manage Hair," *Journal of the Society of Cosmetic Chemists*, vol. 23, pp. 321-331 (May 23, 1972).

(Continued)

*Primary Examiner*—Duc Truong
(74) *Attorney, Agent, or Firm*—Greenblum & Bernstein, P.L.C.

(57) ABSTRACT

The present invention relates to aqueous compositions comprising component (A) which comprises at least one water-soluble component comprising at least one functional group that undergoes a crosslinking reaction, preferably upon drying and/or heating; component (B) which comprises at least one film-forming material, preferably a latex material; and component (C) which comprises at least one component that provides at least one of moisture and/or water barrier properties and/or vapor barrier properties greater than that provided by the combination of components (A) and (B) alone.

101 Claims, No Drawings

U.S. PATENT DOCUMENTS

| | | | |
|---|---|---|---|
| 5,137,633 A | 8/1992 | Wang | |
| 5,158,622 A | 10/1992 | Reichgott et al. | |
| 5,219,914 A | 6/1993 | Warburton, Jr. | |
| 5,281,282 A | 1/1994 | Dolan et al. | |
| 5,282,905 A | 2/1994 | Reichgott et al. | |
| 5,314,945 A | 5/1994 | Nickle et al. | |
| 5,338,807 A | 8/1994 | Espy et al. | |
| 5,356,490 A | 10/1994 | Dolan et al. | |
| 5,387,638 A | 2/1995 | Nakamae et al. | |
| 5,389,405 A | 2/1995 | Purnell et al. | |
| 5,397,646 A | 3/1995 | Nickle et al. | |
| 5,439,010 A | 8/1995 | Ross | |
| 5,543,446 A | 8/1996 | Rodriguez | |
| 5,602,209 A | 2/1997 | Warchol et al. | |
| 5,614,597 A | 3/1997 | Bower | |
| 5,633,309 A | 5/1997 | Warchol et al. | |
| 5,644,021 A | 7/1997 | Maslanka | |
| 5,668,246 A | 9/1997 | Maslanka | |
| 5,685,815 A | 11/1997 | Bottorff et al. | |
| 5,693,371 A * | 12/1997 | Rodzewich et al. | 427/421.1 |
| 5,698,305 A * | 12/1997 | Suzuki et al. | 428/219 |
| 5,716,603 A | 2/1998 | Chen et al. | |
| 5,718,756 A | 2/1998 | Mohler | |
| 5,725,731 A | 3/1998 | Brungardt et al. | |
| 5,738,843 A | 4/1998 | Montgomery | |
| 5,770,184 A | 6/1998 | Keller | |
| 5,811,472 A | 9/1998 | Patel | |
| 5,846,663 A | 12/1998 | Brungardt et al. | |

OTHER PUBLICATIONS

J. C. Sauer, "Ketene Kimers from Acid Hálikes,"*Journal of the American Chemical Society*, vol. 69, pp. 2444-2448 (1947).

*Kirk-Othmer Encyclopedia of Chemical Technology*, Fourth Edition, Supplemental Volume, pp. 803-807, J. Wiley & Sons, (New York 1998).

"Polycup® Resins Crosslinking Agents for Latices and Water-Soluble Polymers," *Hercules Product Data*, Bulletin NP-102A, (1999).

"What is a Nonwoven?" Miller Freeman Inc., (1999) http://www.nonwovens.com/facts/foverview.htm.

"The Airlaid Process," Miller Freeman Inc., (1999) http://www.nonwovens.com/facts/foverview.htm.

"Types of Nonwoven Binders," Miller Freeman Inc., (1999) http://www.nonwovens.com/facts/foverview.htm.

"Chemical Binders for Nonwoven," Miller Freeman Inc., (1999) http://www.nonwovens.com/facts/foverview.htm.

"Vitro-Nails™ " Brochure, IMS Testing Group, date unknown.

"Additives For Water-Based Nail Polish", Schlossman, Society of Cosmetic Chemistry Science Meeting & Technology Showcase, 1988.

* cited by examiner

COMPOSITIONS FOR IMPARTING DESIRED PROPERTIES TO MATERIALS

CROSS-REFERENCE TO RELATED APPLICATION

The present application expressly incorporates by reference herein the entire disclosure of U.S. application Ser. No. 09/613,529, filed Jul. 10, 2000, entitled "Compositions for Imparting Desired Properties to Materials", now U.S. Pat. No. 6,586,520, which is a CIP of U.S. application Ser. No. 09/348,346, filed Jul. 8, 1999, now abandoned, Which is being concurrently filed with the present application.

BACKGROUND OF THE INVENTION

1. Field of the Invention

The present invention relates to aqueous compositions for imparting a variety of characteristics to materials. For example, aqueous compositions of the present invention include compositions for coating/barrier layers, replacements/extenders for latex, and crosslinkers for a variety of substances, as well as in adhesives/binders. Such compositions can impart various desired properties to substrates coated and/or impregnated therewith. Aqueous compositions of the invention are especially suitable for coating substrates, such as physiological substrates, porous substrates, cellulose substrates, textiles, and building materials, such as wood, metal, and glass. The aqueous composition of the present invention can also be used in inks, dye fixatives, adhesives, sealants, cellulosic products, personal care products such as cosmetics and hair styling products, resins, paint, coatings, and non-woven structures to provide adhesion, delivery, surface modification, strength and/or texture, and protection from the effects of liquids, and vapor and gases. A non-woven structure can be a sheet, web, or batt of directionally or randomly oriented fibers of natural and/or man-made fibers or filaments, bonded by friction, and/or cohesion and/or adhesion, excluding paper and products which are woven, knitted, tufted, stitchbonded, or felted by wet milling or not additionally needled, or that are bonded to each other by any techniques known in the art. An example of a non-woven structure includes a non-woven fabric which is a flat, flexible porous sheet structure produced by interlocking layers or networks of fibers, filaments or film-like filamentary structure.

In addition, the composition of the present invention is suitable for use in metal conversion coatings to enhance corrosion resistance of and paint adhesion to metal surfaces.

2. Background of the Invention and Related Art

Materials can be treated with a variety of compositions to impart desired properties thereto.

Substrates are often coated with a coating composition to impart desired characteristics to the substrate, including the surface thereof.

Various substrates have been coated or otherwise treated with coating compositions to impart desired characteristics to the substrate, including the surface thereof. For example, a wide variety of building and finishing materials exists, which are employed in construction of static structures, such as residences and other buildings, and commercial structures, schools, public facilities, and the like. Many such materials are based on non-woven materials. Further, many such materials are coated and/or impregnated with a surface finish coating, either during manufacture, prior to installation, or post-installation, or in a combination of the above situations.

Such materials, particularly ceiling tiles, have been provided with prime coats comprising ethylene-vinyl chloride copolymer emulsions. Particularly suitable materials include those available from Air Products and Chemicals, Inc., of Allentown, Pa., under the trade name AIRFLEX®. Specific examples of such emulsions are disclosed in U.S. Pat. No. 4,673,702 to IACOVIELLO, and U.S. Pat. No. 4,962,141 to IACOVIELLO, et al., both assigned to Air Products and Chemicals, Inc., Allentown, Pa., both of which are hereby incorporated by reference as though set forth in full herein.

Paper for certain applications has been customarily strengthened with resins to impart strength thereto when the paper is wet. Such resins are commonly referred to as "wet strength resins." A frequently employed wet-strength resin for use in papers is that of the broad class of polyamidoamine-epihalohydrin resin polymers for resins. Such resins include those marketed under the trademark KYMENE® by Hercules Incorporated, Delaware. Such resins, and processes for their manufacture, are disclosed in, for example, U.S. Pat. Nos. 2,926,116 and 2,926,154, both to KEIM; U.S. Pat. No. 5,614,597 to BOWER; U.S. Pat. Nos. 5,644,021 and 5,668,246, both to MASLANKA; all assigned to Hercules Incorporated, all of which patents are hereby incorporated by reference as though set forth in full herein.

U.S. Pat. No. 4,859,527 discloses cellulosic non-woven products of enhanced water and/or solvent resistance obtained by pre-treatment of the cellulosic fibers. In some embodiments, this patent discloses that suitable pre-treatment agents include poly(aminoamide) epichlorohydrin resins. Suitable overcoat binders are disclosed as including ethylene-vinyl chloride-acrylamide polymers. Specific examples of the pre-treatment agents include KYMENE®, and HERCOBOND®, including HERCOBOND® 5100; overcoat binders include binders such as AIRFLEX® "EVCl" co-polymers (AIRFLEX® 4500).

There has also been a need for flexible coatings such as pretreatments and precoats on various substrates. Such substrates on which a need for a flexible coating exists include substrates subject to bending and flexing. Such substrates also can include those which can be cut. Ceiling tiles are exemplary of such substrates.

Coating compositions comprising poly(aminoamide) epihalohydrin resins such as KYMENE and latices such as AIRFLEX are used to treat ceiling tiles as disclosed in co-pending application Ser. No. 09/348,346, which is hereby incorporated by reference as though set forth in full herein.

Nail polish is another example of a coating for substrates. Aqueous-based nail polishes are disclosed in commonly assigned co-pending application Ser. No. 09/348,345, which is hereby incorporated by reference as though set forth in full herein. Nail polish is most commonly a colored liquid that dries, not unlike paint, into a hard, shiny coating. Nail polishes sold as articles of commerce are typically solutions and/or dispersions in an organic solvent, such as toluene or acetone.

Conventional nail polishes generally employ nitrocellulose as the film former. Typical formulations are disclosed in "Formulating Nail Lacquer", B. Albert, *Drug and Cosmetic Industry*, Vol. 48, (November 1998), which is hereby incorporated by reference as though set forth in full herein, for its background information on such nail formulations.

U.S. Pat. No. 5,120,259 discloses a water-based nail polish consisting of at least one polyurethane and/or polyurethane copolymer in dispersed form as a binder, with a thickener and acrylated-styrene copolymer. The acrylated-styrene copolymer is employed to increase hardness of the dried coating.

U.S. Pat. No. 5,716,603 discloses a nail polish composition comprising an aqueous solution containing an acrylic resin cross linked with a difunctional acrylated urethane oligomer. This patent notes that nail polish formulations contain other additives, such as plasticizers and coalescents to modify the film and/or provide other desired or functional properties such as gloss, uniform color or resistance to chipping.

Changes in the overall formulation of substrate coatings have been attempted. For example, attempts have been made to improve physical properties such as water resistance, durability, scratch resistance, etc. well as good appearance, including finish color. However, there has been a continuing need for improvement.

SUMMARY OF THE INVENTION

The present invention relates to aqueous compositions comprising component (A) which comprises at least one water-soluble component comprising molecules which interact with or entangle with each other, such as at least one functional group that undergoes a crosslinking reaction, preferably upon drying and/or heating; component (B) which comprises at least one film-forming material, preferably a latex material; and component (C) which comprises at least one component that provides at least one of moisture and/or water barrier properties and/or vapor barrier properties greater than that provided by the combination of components (A) and (B) alone.

Component (A) can be selected from materials such as at least one of acrylamide-based crosslinkable polymers (e.g., cationic functionalized polyacrylamides), polyamidoamine-epihalohydrin resins, polyamines, and polyimines. For example, component (A) can be selected from at least one of epoxy, azetidinium, aldehyde, carboxyl group, acrylate and derivatives thereof, acrylamide and derivatives thereof, and quaternary amine.

The film-forming polymer can be selected from materials such as at least one polymer derived from monomers of alkyl halides of from 2-12 C atoms, alkene halides of from 2-12 C atoms, alkyl acrylamides of from 2-12 C atoms, alkene acrylamides of from 2-12 C atoms, alkyl acrylates of from 2-12 C atoms, and alkene acrylates of from 2-12 C atoms. For example, the film-forming layer can be selected from at least one polymer derived from at least one monomer selected from at least one of styrene, dimethylstyrene, vinyltoluene, chloroprene, butadiene, ethylene, acrylamide, acrylonitrile, acrolein, methylacrylate, ethylacrylate, acrylic acid, methacrylic acid, methyl methacrylate, n-butyl acrylate, vinylidene chloride, vinyl ester, vinyl chloride, vinyl acetate, acrylated urethane, hydroxyethyl acrylate, dimethylaminoethyleneacrylate, and vinyl acetate.

The film-forming polymer can be a latex selected from at least one polymer derived from at least one monomer comprising repeating units derived from an alkyl halide (e.g. a vinyl halide such as vinyl chloride) having at least one double bond and an alkene (e.g. ethylene), wherein the alkyl halide has from 2 to 12 C atoms, and wherein the alkene has from 2 to 12 C atoms.

Component (C) can be selected from materials such as one of sizing materials such as ketene dimers (prepared from fatty acids of preferably from 16 to 24 C atoms, more preferably from 16 to 22 C atoms, and most preferably from 16 to 18 C atoms), alkenyl succinic anhydrides, fatty acids, and wax emulsions (e.g. slack or microcrystalline wax).

The composition can be provided in preferred embodiments such that the dry weight ratio of (A) and (B) to (C) is about 99:1 to 1:99; about 70:30 to about 10:90; or more particularly about 60:40 to about 30:70.

The composition of the invention may further comprise at least one acid, preferably fluoacid (e.g., fluotitanic acid, fluozirconic acid, fluosilicic acid, and fluoboric acid).

The aqueous compositions of the present invention can be used as coating/barrier layers, replacements/extenders for latex, and crosslinkers, as well as in adhesives/binders. When used as coating/barrier layers, the aqueous composition of the present invention provides moisture barrier, edge seal, extenders for latices, stain resistance, water resistance/repellency, and porosity control for porous substrates, such as paper and textiles. Examples of coating/barrier layers include, but are not limited to, additives for texture in paint, binders for coatings (e.g., in paint), paint primers for all surfaces, additives for paper (e.g., paper coatings, paper printability, paper sizing, and paper wet/dry strength agent), precoats for coated paper, primers for printing, and replacements/extenders for latex in all applications using latex. In addition, the composition of the present invention is suitable for use in metal conversion coating to enhance corrosion resistance of and paint adhesion to metal surfaces.

The aqueous composition of the present invention can also be used in adhesives/binders, such as adhesives, binders (e.g., for coatings and personal care products such as cosmetics and hair styling products), additives for engineered wood products, dye fixatives, paper wet/dry strength additives, additives in paint, resins such as permanent press resins (e.g., for wrinkle resistance), precoats for coated papers, primers for printing for any surfaces (e.g., wood, paper, metal, etc.), protective coatings, surface modifiers for wood/metal/glass, and replacement/extender for latex as internal binders in all applications using latex. When used in an adhesive/binder, the aqueous composition of the present invention can provide dimensional stability control and/or strength for paper, wood, and textiles, as well as texture in paint.

In addition, the aqueous composition of the present invention can also be used as crosslinkers in additives for engineered wood products, paper sizing agents, paper wet/dry strength additives, permanent press resins, replacement for latex as internal binders in all applications using latex, surface modifiers in wood/metal/glass, ink vehicles, and textile wet processing aids. The use of the aqueous composition of the present invention as crosslinkers provides sealing properties, stain resistance, textile strength, and water resistance repellency.

In addition, the present invention is also directed to coated substrates and methods of preparing coated substrates such as cellulosic products, non-woven sheets, ceiling tiles, and metal. Preferably, the present invention is also directed to methods of preparing coated substrates such as cellulosic products, non-woven sheets, ceiling tiles, and metal using components (A), (B), and (C).

Thus, the invention provides a method comprising (1) coating a substrate with a coating composition comprising: (A) at least one water-soluble component comprising at least one functional group that undergoes a crosslinking reaction; (B) at least one film-forming polymer; and (C) at least one component which provides at least one of moisture barrier properties and/or vapor barrier properties greater than that provided by the combination of components (A) and (B) alone; and (2) curing the coating composition on the substrate.

The present invention is also directed to methods for metal conversion coating using the composition containing components (A), (B), and (C) and at least one acid, preferably fluoacid (e.g., fluotitanic acid, fluozirconic acid, fluosilicic acid, and fluoboric acid), preferably at a pH from about 1.5 to about 5.0. Preferably the present invention is directed to a method of forming a substantially chromium-free conversion coating on a metal surface using the composition containing components (A), (B), (C) and at least one acid, preferably fluoacid (e.g., fluotitanic acid, fluozirconic acid, fluosilicic acid, and fluoboric acid), preferably at a pH from about 1.5 to about 5.0. More preferably, the present invention is directed to a method of forming a substantially chromium-free, dried in place conversion coating on a metal surface using the composition containing components (A), (B), (C) and at least one acid, preferably fluoacid (e.g., fluotitanic acid, fluozirconic acid, fluosilicic acid, and fluoboric acid), preferably at a pH from about 1.5 to about 5.0. The amount of (A), (B), and (C) can be, e.g., from about 0.1 to about 90% by weight, and the amount of fluoacid can be, e.g., from about 0.2 to about 20% by weight.

Further, the present invention also relates to methods of preparing cellulosic products, preferably ceiling tiles and non-woven products such as sheets.

The present invention is also directed to substrates, preferably metal substrates comprising a cured composition which comprises component (A) which comprises at least one water-soluble component comprising at least one functional group that undergoes a crosslinking reaction, preferably upon drying and/or heating; component (B) which comprises at least one film-forming material, preferably a latex material; and component (C) which comprises at least one component that provides at least one of moisture and/or water barrier properties and/or vapor barrier properties greater than that provided by the combination of components (A) and (B) alone.

The present invention also relates to cellulosic products and methods of making, preferably ceiling tiles and non-woven products such as sheets comprising a composition which comprises component (A) which comprises at least one water-soluble component comprising at least one functional group that undergoes a crosslinking reaction, preferably upon drying and/or heating; component (B) which comprises at least one film-forming material, preferably a latex material; and component (C) which comprises at least one component that provides at least one of moisture and/or water barrier properties and/or vapor barrier properties greater than that provided by the combination of components (A) and (B) alone.

The invention provides a method of substantially simultaneously or sequentially adding a composition to a system comprising cellulosic fibers, wherein the system is selected from at least one of aqueous system, felt, web, and combinations thereof (A) at least one water-soluble component comprising at least one functional group that undergoes a crosslinking reaction; (B) at least one film-forming polymer; and (C) at least one component which provides at least one of moisture barrier properties and/or vapor barrier properties greater than that provided by the combination of components (A) and (B) alone.

DETAILED DESCRIPTION OF THE PREFERRED EMBODIMENTS

The present invention relates to aqueous compositions comprising component (A) as defined herein, component (B) as defined herein, and component (C) as defined herein.

The aqueous compositions of this invention have various utilities including uses as coating/barrier layers, replacements/extenders for latex, and crosslinkers, as well as uses in adhesives/binders. When used as coating/barrier layers, the aqueous composition of the present invention provides moisture barrier, edge seal, extenders for latices, stain resistance, moisture and/or water resistance/repellency, and porosity control for porous substrates. Examples of porous substrates include, but are not limited to, paper products, non-woven products such as sheets, and textiles. "Extender of latices" refers to the ability of the composition of the present invention (i.e., components (A), (B), and (C)) to be a substitute for latex, and can be used in place of or partial substitution for a latex in any applications where latex could be used.

Examples of coating/barrier layers include, but are not limited to, additives for texture in paint, binders for coatings (e.g., in paint), paint primers for all surfaces, additives for paper (e.g., paper coatings, paper printability, paper sizing, and paper wet/dry strength agent), precoats for coated paper, primers for printing, and replacements/extenders for latex as internal binders in all applications using latex.

The aqueous composition of the present invention can be used in adhesives/binders, such as adhesives, binders (e.g., for coatings and personal care products such as cosmetics and hair styling products), additives for engineered wood products, dye fixatives, paper wet/dry strength additives for cellulosic products (e.g., non-woven products such as sheets and ceiling tiles), additives in paint, resins such as permanent press resins (e.g., wrinkle resistance), precoats for coated papers, primers for printing, protective coatings, surface modifiers for wood/metal/glass, and replacement/extender for latex as internal binders in all applications using latex. When used in an adhesive/binder, the aqueous composition of the present invention can provide dimensional stability control and/or strength for paper, wood, and textiles, as well as texture in paint (such that when a paint is dry, it forms a surface having irregular contours).

The aqueous composition of the present invention can also be used as crosslinkers in additives for engineered wood products, paper sizing agents, paper wet/dry strength additives, permanent press resins, replacement for latex as internal binders in all applications using latex, surface modifiers in wood/metal/glass, ink vehicles (which provide impact to ink set and gloss), and textile wet processing aids. The use of the aqueous composition of the present invention as crosslinkers provides sealing properties, stain resistance, textile strength, and water resistance repellency.

In addition, the present invention is also directed to methods of preparing coated substrates such as cellulosic products, non-woven sheets, ceiling tiles, and metal. Preferably, the present invention is also directed to methods of preparing coated substrates such as cellulosic products, non-woven sheets, ceiling tiles, and metal using components (A), (B), and (C).

The invention also relates to methods of preparing a coated substrate comprising, for example coating a substrate with a coating composition including components (A), (B) and (C); and curing the coating composition on the substrate. Further, the present invention includes methods for metal conversion coating which includes coating a substrate with a coating composition including components (A) (B), and (C), and drying the composition in place on the surface of a substrate or rinsing a substrate with a coating composition. The methods of metal conversion coating comprise using the composition containing components (A), (B), and (C) and at least one acid, preferably fluoacid (e.g., fluotitanic acid, fluozirconic acid, fluosilicic acid, and fluoboric acid), preferably at a pH from about 1.5 to about 5.0. Preferably the present invention is directed to a method of forming a substantially chromium-free conversion coating on a metal surface using the composition containing components (A), (B), (C) and at least one acid, preferably fluoacid (e.g., fluotitanic acid, fluozirconic acid, fluosilicic acid, and fluoboric acid), preferably at a pH from about 1.5 to about 5.0. More preferably, the present invention is directed to a method of forming a substantially chromium-free, dried in place conversion coating on a metal surface using the composition containing components (A), (B), (C) and at least one acid, preferably fluoacid (e.g., fluotitanic acid, fluozirconic acid, fluosilicic acid, and fluoboric acid), preferably at a pH from about 1.5 to about 5.0.

"Substantially chromium-free conversion coating" refers to a conversion coating that does not intentionally include added chromium, but can contain a trace amount of chromium.

Further, the present invention also relates to methods of preparing cellulosic products, preferably ceiling tiles and non-woven products such as sheets using the composition containing components (A), (B), and (C).

Further, the present invention also relates to methods of preparing cellulosic products, preferably ceiling tiles and non-woven products such as sheets using the composition containing components (A), (B) and (C). Specifically the present invention relates to methods of preparing cellulosic products which comprise (1) substantially simultaneously; or (2) sequentially adding a composition to a system comprising cellulosic fibers, wherein the system is selected from at least one of aqueous system, felt, web, and combinations thereof, and wherein the composition comprises components (A), (B), and (C).

"Substantially simultaneously adding" or "simultaneously adding" refers to adding two substances to a slurry or suspension (e.g., such as a cellulosic slurry) with substantially no time difference and essentially at the same position in the system or process. The two substances being added can be in the form of a mixture as well as separately added, e.g., by adding one substance during the addition of the other.

"Sequential addition" refers to at least two different substances being added to different locations at the same time or at a different time and/or the same location at different time on a machine used to prepare cellulose products. These locations are far away enough so that the one substance added is mixed with the cellulose slurry before another substance is added. A combination of sequential and simultaneous addition may also be employed.

The present invention also relates to cellulosic products, preferably ceiling tiles and non-woven products such as sheets comprising a composition which comprises components (A), (B), and (C).

Component (A)

Component (A) may be any component having molecules which undergo molecular interaction such as molecular entanglement, crosslinking, molecular bonding, etc. upon drying and/or heating. Without wishing to be bound by theory, suitable materials for component (A) include, but are not limited to, materials that interact on a molecular level to form a network distributed within component (B) when components (A) and (B) are cured.

As discussed above, component (A) of the aqueous composition of the present invention can comprise at least one water-soluble component comprising at least one functional group that undergoes a crosslinking reaction, preferably upon drying and/or heating. "Water-soluble component" refers to a component that dissolves in water to form a homogeneous liquid. Examples of suitable functional groups of component (A) preferably include, but are not limited to, epoxy, azetidinium, aldehyde, carboxyl group, acrylate and derivatives thereof, acrylamide base and derivatives thereof, and quaternary amine, more preferably azetidinium, epoxy, and aldehyde, and most preferably azetidinium and epoxy.

Examples of component (A) preferably include, but are not limited to, acrylamide-based crosslinkable polymers, polyamidoamine-epihalohydrin resins, and polyamines, and polyimines, more preferably cationic functionalized polyacrylamides (HERCOBOND 1000® manufactured by Hercules Incorporated) such as those disclosed in U.S. Pat. No. 5,543,446 which is incorporated herein by its entirety, creping aids such as CREPETROL® A 3025 disclosed in U.S. Pat. No. 5,338,807 which is incorporated herein by its entirety, and polyamidoamine-epihalohydrin resins such as those disclosed in U.S. Pat. Nos. 2,926,116 and 2,926,154, to KEIM, incorporated by reference in their entirety herein.

Preferred polyamidoamine-epihalohydrin resins can also be prepared in accordance with the teachings of U.S. Pat. No. 5,614,597 to BOWER and commonly assigned to Hercules Incorporated, incorporated by reference in their entirety herein. As discussed in U.S. Pat. No. 5,614,597 to BOWER, these processes typically involve reacting aqueous polyamidoamine with an excess of epihalohydrin to convert amine groups in the polyamidoamine to epihalohydrin abducts. During the reaction halohydrin groups are added at the secondary amine groups of the polyamidoamine as shown in the following example, using epichlorohydrin as the epihalohydrin:

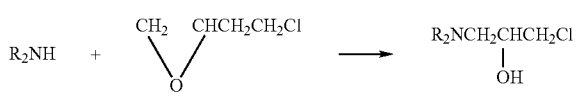

where $R_2N-$ represents a secondary amine group of the polyamidoamine.

After the epihalohydrin has been added and when heat evolution has subsided, the reaction mixture is heated to effect crosslinking and viscosity increase. During this reaction, azetidinium groups are formed. These functional groups are typically employed to impart wet strength to paper by forming a strong crosslinked network with the paper fibers.

Preferred polyamidoamine-epihalohydrin resins include polyamidoamine-epichlorohydrins such as those sold by Hercules Incorporated of Wilmington, Del., under various trade names. Preferred polyamidoamine-epihalohydrin resins available from Hercules include the KYMENE® resins and the HERCOBOND® resins. KYMENE 557H® resin; KYMENE 557LX® resin; KYMENE 557SLX® resin; KYMENE 557ULX® resin; KYMENE 557ULX2® resin; KYMENE 709® resin; KYMENE 736® resin; and HERCOBOND 5100® resin. Of these, KYMENE 557H® resin and HERCOBOND 5100® are especially preferred polyamidoamines, available in the form of aqueous solutions. KYMENE 763® resin (a polyamine) can also be employed as component (A). It is expressly contemplated that equivalents to each of the foregoing resins are within the scope of the present invention.

Component (B)

Without wishing to be bound by theory, suitable materials for component (B) include any materials that are capable of forming a continuous phase that can be modified by the network structure of component (A) described above. As discussed above, component (B) comprises at least one film-forming material such as a polymer, preferably a latex material.

Examples of other film-forming material of the present invention preferably include, but are not limited to, polymers derived from monomers including at least one of alkyl halides of from 2-12 C atoms, alkene halides of from 2-12 C atoms, alkyl acrylamides of from 2-12 C atoms, alkene acrylamides of from 2-12 C atoms, alkyl acrylates of from 2-12 C atoms, and alkene acrylates of from 2-12 C atoms.

In some aspects of the present invention, the film-forming layer comprises a latex selected from at least one polymer comprising repeating units derived from an alkyl halide having at least one double bond and an alkene, wherein the alkyl halide has from 2 to 12 C atoms, and wherein the alkene has from 2 to 12 C atoms.

"Latex" refers to an aqueous dispersion of a water-insoluble polymer. Latex materials are prepared in an emulsion polymerization process wherein the insoluble monomer is emulsified, with a surfactant, into small particles of less than about 10,000 nanometers or 10 microns in diameter in water and polymerized using a water-soluble initiator. The resultant product is a colloidal suspension of fine particles, preferably about 50 to 1000 nm in diameter. See, for example, *Kirk-Othmer Encyclopedia of Chemical Technology*, fourth edition, volume 15, page 51 (J. Wiley & Sons, New York, 1995), which is hereby incorporated herein in its entirety. "Colloidal suspension" refers to a dispersion of fine droplets or particles in a liquid medium.

Suitable latices can be readily identified by those of ordinary skill in the art, based on physical properties using fully conventional considerations, including stability, rheology, film formation and film properties, interfacial reactivity and substrate adhesive) can be determined by colloidal and polymeric properties of the latex. Colloidal properties include particle size and morphology distribution solids, pH, viscosity, and stability. Molecular weight distribution, monomer sequence and distribution, glass-transition temperature and crystallinity as is well known in the art.

Latex applications include, but are not limited to, uses as adhesives, binders, coatings, elastic materials, foam products, modifiers, and supports for immobilization of other materials.

Commercially available latices are derived from a large variety of monomers including, but not limited to, styrene, dimethylstyrene, vinyltoluene, chloroprene, butadiene, ethylene, acrylamide, acrylonitrile, acrolein, methylacrylate, ethylacrylate, acrylic acid, methacrylic acid, methyl methacrylate, n-butyl acrylate, vinylidene chloride, vinyl ester, vinyl chloride, vinyl acetate, acrylated urethane, hydroxyethyl acrylate, dimethylaminoethyleneacrylate, and vinyl acetate.

Other examples of the latex material preferably include, but are not limited to, copolymers of alkyl halides and alkene halides, such as copolymers of vinyl or allyl halides and alkenes. Any alkyl halides and any alkene halides, which copolymerize to form copolymers with each other, may be employed. Standard textbooks list exemplary materials. See, for example, *Organic Chemistry*, Morrison & Boyd, Allyn and Bacon, Inc. 1973, which is hereby incorporated by reference as though set forth in full herein for its disclosure of such materials. Preferred alkyl halides include allyl and/or vinyl halides of from 2-12 C atoms, preferably from 2-6 C atoms, more preferably from 2-4 C atoms and most preferably about 2 C atoms. Copolymers of vinyl halides (especially vinyl chloride) and alkenes, preferably of from 2-12 C atoms, preferably from 2-6 C atoms, more preferably from 2-4 C atoms and most preferably of about 2-3 C atoms, especially propylene and/or ethylene, are especially preferred.

Any copolymers of vinyl chloride and ethylene may be employed as component (B). Exemplary copolymers of vinyl chloride and ethylene are disclosed in U.S. Pat. No. 4,673,702 to IACOVIELLO, and U.S. Pat. No. 4,962,141 to IACOVIELLO, et al., incorporated by reference in their entireties herein. These copolymers (also referred to herein as "EVCl" copolymers) may be prepared in any way. By way of example, they may be prepared (preferably in the form of an emulsion) as described in U.S. Pat. No. 4,962,141 to IACOVIELLO et al. by the following procedures.

Suitable EVCl copolymer emulsions may be prepared by copolymerizing the monomers in the presence of suitable emulsifying agents, i.e., protective colloids and surfactants, in an aqueous medium under pressures generally not exceeding about 100 atm and in the presence of a redox system which is added incrementally. The copolymerization reaction is performed under an ethylene pressure which is sufficient to provide the copolymer with about 5 to 35 wt % ethylene content, preferably about 15 to 25 wt %. Pressures of about 50 to 100 atm are generally used to afford such an ethylene content.

The EVCl copolymer emulsions may additionally contain from 0.1 to 30 wt % of an external crosslinking agent based upon the total weight of the copolymer. Suitable external crosslinking agents include melamine/formaldehyde resins, polyisocyanates such as water dispersible polymeric methyl diphenyl diisocyanates and water based phenolic resins.

In carrying out the polymerization, substantially all of the polyvinyl alcohol and a portion of the vinyl chloride is initially charged into the polymerization vessel which is then pressurized with ethylene. Most advantageously, at least about 5 wt % and preferably, at least about 15 wt % of the total vinyl chloride to be polymerized is initially charged into the reactor. The remainder of the vinyl chloride is added, desirably at a substantially uniform rate, after the initially charged vinyl chloride monomer content has been substantially reduced as evidenced by a decrease in the rate of polymerization. This controlled addition avoids over pressurization of the reactor. No more than about 60% of the vinyl chloride should be charged initially since a prepolymer can be generated in-situ in order to obtain the desired stable emulsions.

The quantity of ethylene entering the copolymer is influenced by the pressure, the mixing, the addition rate and amount of free radical generating source. The ethylene content of the copolymer can be increased by utilizing a higher ethylene pressure, increasing agitation during mixing or employing a higher free radical source rate.

The process of forming the EVCl copolymer emulsions may comprise preparing an aqueous solution containing substantially all of a polyvinyl alcohol dispersing agent. This aqueous solution and the initial charge of vinyl chloride may be added to the polymerization vessel and ethylene pressure may then be applied to the desired value. The mixture is mixed thoroughly to dissolve ethylene in the vinyl chloride and into the water phase. The charge can be conveniently elevated to polymerization temperature during this mixing period. A polymerization temperature of about 55° C. and an ethylene pressure in the range of 750 psig to 1000 psig may be employed to provide a copolymer with about 20-30 wt % ethylene. Mixing can be effected by means of an agitator or other known mechanism.

The polymerization is initiated by introducing initial amounts of a free radical generating source into the reactor vessel containing the monomer premix. When employing a redox system, either the oxidant or reductant component can be added initially to the aqueous medium containing the polyvinyl alcohol and vinyl chloride with the other redox component added to initiate the reaction. Upon initiating the polymerization, any desired a monomer such as the hydroxyalkyl- or carboxylic acid-containing functional co-monomers disclosed herein may be added incrementally to the reaction vessel.

The reaction may generally be continued until polymerization is no longer self-sustaining and desirably until the residual vinyl chloride content is below 0.5%. The completed reaction product is removed from the presence of ethylene and maintained at a temperature above the $T_g$ of the copolymer while sealed from the atmosphere. The reaction mixture can also be transferred to a degasser for removal of unreacted ethylene.

It will be readily appreciated by those of ordinary skill in the art that the foregoing is exemplary only, and that the generically and/or specifically defined reactants and conditions can be substituted by equivalent reactants and conditions. Especially preferred copolymers for component (B) include those marketed by Air Products and Chemicals, Inc., of Allentown, Pa., under the trade name AIRFLEX®; especially, AIRFLEX 4530®, AIRFLEX 4514®, and AIRFLEX 4500®. It is expressly contemplated that equivalents to such vinyl chloride/ethylene copolymers are within the scope of the present invention. Thus, for example, any polymer or copolymer which moderates component (A) such as by functioning to flexibilize component (A), and/or any polymer or copolymer that inhibits crosslinking such that when the water from the composition is driven off, and the coating is cured, can be bent 180°, preferably 360°, without cracking or delaminating, is within the scope of the invention. Preferably any copolymer which functions to flexibilize component (A), and/or any polymer or copolymer that inhibits crosslinking such that when the coating is applied to a substrate, such as an aluminum sheet and the water from the composition is driven off, the coating can be bent 180°, preferably 360°, without cracking or delaminating from the substrate, is within the scope of the invention. Preferably, the combination of components (A) and (B) result in compositions exhibiting good memory, in addition to the good flexibility discussed above. For example, such compositions preferably exhibit good memory such that a cured coating when deformed will return to the position or configuration in which it was before it was deformed.

Other materials for component (B) include, but are not limited to, NEOCAR® manufactured by Union Carbide (vinyl ester/acrylic acid), RES 3077® manufactured by Rohm & Haas (vinyl acetate/acrylic acid), FLEXTHANE 620® by Air Products (vinyl chloride amide terpolymer), VINAC 884® by Air Products (vinyl acetate), DOW 620® by Dow Chemical Company (styrene butadiene rubber), FLEXBOND 325® (vinyl acetate-acrylic acrylic copolymer latex) by Air Products, LUCIDENE 243® (styrene-acrylic polymer emulsion), HYCAR 26256® (acrylic ester copolymer latex) and MORKOTE 1725® (acrylic copolymer emulsion).

As discussed above, such materials for component (B) include water compatible systems such as copolymers that can contain the following monomers: methyl methacrylate, butyl acrylate, styrene vinylidene chloride, acrylic acid, and methacrylic acid. Suitable copolymers include acrylated urethanes prepared by reacting a hydroxy acrylate or meth-acrylate; a diol, polyester or diamine; and a diisocyanate can be used. Preferred monomers are disclosed in U.S. Pat. No. 5,716,603, which is hereby incorporated by reference as though set forth in full herein for its teachings in this regard. Other copolymers that appear to be useful include acrylic and vinyl acrylic-based materials.

Other examples of (B) include, but are not limited to, vinyl ester/acrylic, vinyl acetate/acrylic, vinyl acetate/ethylene, vinyl chloride amide terpolymer, vinyl acetate, and styrene/ibutadiene.

Other materials for component (B) can also include FLEXBOND 325® (vinyl acetate-acrylic copolymer latex), LUCIDENE 243® (styrene-acrylic polymer emulsion), HYCAR 26256® (acrylic ester copolymer latex) and MORKOTE 1725® (acrylic copolymer emulsion).

Component (C)

As discussed, component (C) comprises at least one component that provides at least one of moisture and/or water barrier properties and/or vapor barrier properties greater than that provided by the combination of components (A) and (B) alone. For example, component (C) imparts enhanced water resistance/water repellency or moisture and/or water barrier properties as demonstrated in the enhanced water drop absorption time discussed in the Example section below.

"Water resistance" refers to the property of a substrate that allow it to resist or prevent water from affecting the substrate. Water resistance properties reduce, to an extent, the ability of the water to wet or penetrate the surface. "Wet" refers to the ability of a liquid to cover or soak the substrate. For example, a paper sizing agent provides resistance to penetration of the paper substrate by a liquid, The liquid will eventually penetrate into the paper, but does so at a slower rate than a paper that does not contain a sizing agent.

"Water repellency" refers to the property of a substrate that makes it incapable of adhering to, taking up, or holding water. A coating might be applied to a substrate to provide this property.

Examples of the component (C) include, but are not limited to, sizing materials (e.g., ketene dimers, alkyl succinic anhydride, and alkenyl succinic anhydride (ASA)), fatty acids, and wax emulsions (e.g., Microlube C®, a product of Hercules Incorporated).

Alkenyl succinic anhydride (ASA) made from alpha olefins and maleic anhydride, and can be used in the present invention as an alternative to sizing agents such as a ketene dimer.

Suitable ketene dimers include, but are not limited to, alkyl ketene dimers, alkenyl ketene dimers, and/or multimers components which may comprise ketene dimers of Formula I, below:

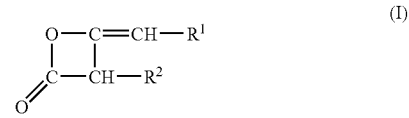

(I)

wherein $R^1$ and $R^2$, which can be the same or different, are organic hydrophobic groups, defined in further detail below.

Suitable AKD multimers for use in the present invention include compounds of Formula (II), below:

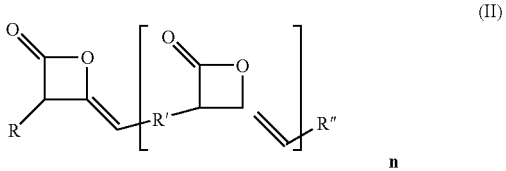

(II)

wherein n, R, R' and R" are as defined below.

The AKD component can include compounds of Formula I alone, compounds of Formula II alone, or mixtures of compounds of Formulae I and II.

In Formulae (1) and (II) above, R and R" are the same or different and are an organic hydrophobic group having at least 6 C atoms, independently selected from the group of straight (linear) or branched alkyl or straight (linear) or branched alkenyl; and R' is a branched or straight chain, or alicyclic, of from about 1 to about 40 carbon atoms. Mixtures of compounds of the foregoing can also be employed.

Suitable ketene dimers and/or multimers include saturated (branched and/or straight chain) and unsaturated (branched and/or straight chain) compounds. Preferred compounds include ketene dimers of Formula I, as described above. Preferred compounds of Formula I are those wherein $R^1$ and $R^2$, which can be the same or different, are organic hydrophobic groups, preferably saturated or unsaturated hydrocarbon structures such as alkyl and alkenyl (each can independently be straight or branched chain) having at least 6 C atoms, more preferably at least 8 C atoms, cycloalkyl having at least 6 carbon atoms, aryl, aralkyl and alkaryl, and preferably straight or branched alkyl and alkenyl groups of 12-30 C atoms, more preferably 16-22 C atoms, and in some embodiments, most preferably 16-18 C atoms.

Expanding on the above, in cases where $R^1$ and $R^2$ are both saturated, the compounds of Formula I can be termed alkyl ketene dimers. However, in cases wherein one or both of $R^1$ and $R^2$ contain unsaturation (by virtue of, for example, the presence of one or more double bonds) the compounds of Formula I can be termed alkenyl ketene dimers. Thus, both alkyl ketene dimers and alkenyl ketene dimers are embraced by the term AKD herein, and therefore by Formula I.

Thus, $R^1$, and $R^2$, which can be the same or different, can have mono or polyunsaturation, can be straight or branched chained, and have from about 1 to about 5 double bonds in the chain, preferably from about 1 to about 3 double bonds and more preferably 1 or 2 double bonds and contain the carbon atom ranges specified above.

Suitable ketene dimers for use in the present invention are disclosed in U.S. Pat. No. 4,522,686, to DUMAS and U.S. Pat. No. 4,816,073 to HELMER et al., incorporated by reference above, which patents are also incorporated by reference as though set forth in full herein for their disclosures of alkyl ketene dimers, alkenyl ketene dimers, and starting materials for making such ketene dimers.

Suitable ketene multimers, e.g., 2-oxetanone-based ketene multimers, are also well-known to those of ordinary skill in the art. Referring to Formula (II) above, suitable ketene multimers for use with the present invention are those wherein n is an integer of at least 1, preferably 1 to about 20 and more preferably about 1 to about 8, even more preferably about 1 to about 6, and even more preferably about 2 to about 5.

Mixtures of the 2-oxetanone ketene multimers preferably contain region isomers of such multimer compounds and preferably contain an average n of from about 1 to about 6 and more preferably from about 2 to about 5. Such mixtures of 2-oxetanone ketene multimers may also contain some 2-oxetanone ketene dimer, i.e., n=0 in formula (II) (of course, as will be readily understood, when n=0, a compound in accordance with Formula (I) results), as a consequence of the preparation method (described below) used to make the multimers.

R and R" are substantially hydrophobic in nature, are acyclic, are preferably hydrocarbons of at least about 4 carbon atoms in length, preferably at least 6, and may be the same or different. R and R" are more preferably about C 10-C 20 and most preferably about C 14-C 16.

R and R", which may be the same or different, are preferably independently selected from the group of straight (linear) or branched alkyl, or straight (linear) or branched alkenyl. R and R" are more preferably linear alkenyl. Preferably not all R and R" substituents are straight alkyl chains and preferably at least 25% by weight of the sizing agent comprises the 2-oxetanone structure in which at least one of R and R" is not straight chain (linear) alkyl. R and R" are ordinarily derived from a monocarboxylic acid reactant, e.g., fatty acid and preferably an unsaturated fatty acid, when the ketene multimer is prepared from reaction of a monoacid component with a diacid component, as described below.

R' may be a branched, straight chain, i.e., linear, or alicyclic, i.e., cyclic-containing, hydrocarbon and is preferably a hydrocarbon of from about 1 to about 40 carbon atoms. R' may more preferably be selected from about C 2 - C 12 and most preferably from C 4 - C 8; in such cases, R' is preferably a straight chain alkyl. Alternatively, R' may more preferably be selected from about C 20 - C 40 and most preferably from about C 28 - C 32; R' is preferably branched or alicyclic, for the more preferred about C 20 -C 40 and most preferred about C 28 - C 32.

R' is ordinarily derived from a dicarboxylic acid reactant when the ketene multimer is prepared from reaction of a monoacid component with a diacid component.

Ketene dimers and multimers and emulsions thereof which can be employed in the present invention include the PRECIS sizing agents commercially available from Hercules Incorporated, and which are disclosed in co-pending U.S. patent application Ser. No. 08/192,570, filed Feb. 7, 1994 (to be issued as U.S. Pat. No. 5,685,815 on Nov. 11, 1997; European family member to be published as EP 666,368 on Aug. 9, 1998), the disclosure of which is hereby incorporated by reference as though set forth in full herein. Co-pending U.S. patent application Ser. No. 08/439,057, filed May 8, 1995 (European family member published May 8, 1995), which is hereby incorporated by reference as though set forth in full herein, discloses ketene dimers and multimers useful in the invention that are made from saturated and unsaturated fatty acids and emulsions thereof. Co-pending U.S. patent application Ser. No. 08/601,113, filed Feb. 16, 1996 (PCT/US96/12172 filed Jul. 25, 1996), which is hereby incorporated by reference as though set forth in full herein, discloses ketene multimers useful in the invention. Canadian Patent 2,117,318, laid open Dec. 11, 1994, which is hereby incorporated by reference as though set forth in full herein, discloses ketene multimers and emulsions thereof useful in the present invention.

Examples of preferred commercial AKD's of the present invention include, but are not limited to, alkyl ketene dimers such as those sold by Hercules Incorporated of Wilmington, Del., under various trade names. Preferred alkyl ketene dimers available from Hercules Incorporated include HERCON® 70, HERCON® 72, HERCON® 79, HERCON®24D, AQUAPEL®610, PRECIS 800 (for those compounds wherein $R^1$ and $R^2$ are primarily in the C16 range) (IUPAC name: 2-oxetanone,4-(8-heptadecenylidene),3-(7-hexadecenyl) CAS number 56000-16-9) (liquid at room temperature); AQUAPEL 364 (for those compounds wherein $R^1$ and $R^2$ are primarily in the C16-18 range) (IUPAC name: 2-oxetanone,3-(C12-C16)alkyl,4-(C13-C17)alkylidene; CAS number 84989-41-3) (M.P. 40-47° C.); AQUAPEL 291 (for those compounds wherein $R^1$ and $R^2$ are primarily in the C18 range) (IUPAC name: 2-oxetenone,3-(C14-C16)alkyl,4-(C15-C17)alkylidene; CAS number 98246-81-8) (M.P. 60-62° C.); and AQUAPEL 532 (for those compounds wherein $R^1$ and $R^2$ are primarily in the C22 range) (IUPAC name: 2-oxetanone,3-eicosyl,4-heneicosylidene (CAS number 83707-14-9) (M.P. 63-64° C.).

The ketene dimer compound can be prepared by known methods. One such method is dehydrohalogenating acid chlorides by aliphatic tertiary amines as described in the *Journal of the American Chemical Society*, Vol. 69, pp. 2444-8.

Compositions

The aqueous compositions of the invention are preferably employed in the form of an aqueous admixture, preferably an aqueous emulsion, and conveniently in preferred embodiments, in the form of an aqueous emulsion system resulting from the admixture of component (A), component (B), and component (C). In addition, the aqueous composition of the present invention can include, water and at least one surfactant and/or additive.

The pH of the aqueous composition containing components (A) and (B) can be adjusted to suit particular utilities. Preferably, the pH is from about 3 to about 9, more preferably from about 3 to about 7, and most preferably about 4.5.

The pH of the aqueous composition containing components (A), (B), and (C) can be adjusted to suit particular utilities. Preferably, the pH is greater than about 7.5, more preferably from about 8.8 to 11.5, and most preferably about 10.2.

The present invention is preferably prepared by adding 75 g of component (A), preferably Hercobond 5100® to 11.11 g an emulsion of component (B), preferably Airflex 4530® with mechanical stirring and adding water to make a 100 g solution.

13.89g of demineralized water is added to the emulsion to yield a slightly blue opaque white dispersion. The dispersion is then allowed to stir for about 15 minutes at room temperature. 100 g aliquot of an emulsion of component (C) is then added to the dispersion to yield an opaque white dispersion.

Aqueous compositions of the invention may also be prepared by mixing commercially available solutions of component (A), component (B), and component (C). The mixture is further mixed to form an aqueous composition. Because such products are commercially available, it is expedient and convenient to employ components (A), (B) and (C) "as received" from the suppliers, although this is not required. As illustrative examples, such solutions are available in concentrations of about 12.5% ((conveniently expressed as percent solids) based on wet weight of resin to total weight of "as received" solution) for component (A), concentrations of up to about 99%. preferably from about 15% to about 70%, more preferably from about 25% to about 60%, and most preferably from about 40% to about 45%,(based on wet weight of resin to total weight of "as received" emulsion); for component (B) concentrations of up to about 13%, preferably from about 2% to about 11%, more preferably from about 3% to about 8%, and most preferably from about 5% to about 7%,(based on wet weight of resin to total weight of "as received" emulsion); and for component (C) concentrations of up to about 99%, preferably from about 10% to about 90%, more preferably from about 30% to about 70%, and most preferably from about 50% to about 60%,(based on wet weight of resin to total weight of "as received" emulsion).

The invention may have content of solids of component (A) (based on total solids) in a range preferably from about 5% to about 60 %, more preferably from about 10% to about 55%, even more preferably from about 20% to about 50%, and most preferably from about 30% to about 35% (based on the total dry weight of components (A), (B), and (C)); content of resin of component (B) (based on total solids) in a range preferably from about 3% to about 40 %, more preferably from about 5% to about 30%, even more preferably from about 10% to about 25%, and most preferably from about 15% to about 20%; and content of resin of component (C) (in terms of active ingredient in solid, i.e., resin) in a range preferably from about 5% to about 95%, more preferably from about 15% to about 80%, even more preferably from about 25% to about 70%, and most preferably from about 44% to about 55%.

The amounts of component (A), component (B), and component (C) employed in the aqueous compositions of the invention may also be expressed in terms of a ratio (A) and (B):(C), based on the dry weight of polymer of components (A) and (B) to the dry weight of the polymer of component (C) (that is (A) and (B)/(C)). The aqueous compositions of the invention include those wherein the ratio of (A) and (B):(C) is preferably from about 99:1 to about 1:99, more preferably from about 70:30 to about 10:90, still more preferably from about 80:20 to 10:90, even more preferably from about 60:40 to 40:60 and most preferably from about 60:40 to 30:70.

Optional Surfactants and Additives

In preparing the aqueous compositions of the invention, solutions of components (A), (B) and (C), water, and optionally, at least one surfactant and/or at least one additive and/or a least one acid, may be mixed in any suitable mixing vessel, preferably with agitation, such as stirring. A mixing vessel equipped with a stirrer may be employed particularly for this purpose. These components may be added to the mixing vessel in any order of addition, or concurrently.

The aqueous compositions also preferably comprise a surfactant. Suitable surfactants include non-ionic, anionic and cationic surfactants. TERGITOL®, TRITON GR7M®, TRITON X 100®, Triethylamine (TEA), AQUAQUEST 2120® (available from GEO Specialty Chemicals, Cedertown, Ga.) and water are exemplary. A preferred surfactant is TRITON X-100® (an octylphenoxypolyethoxyethanol nonionic surfactant) available from Union Carbide Chemicals and Plastics Company, Incorporated, Danbury, Conn. Surfactants are preferably employed in amounts of up to about 10%, by weight. Preferred ranges for amounts of surfactant are in the range of about 0-5%, by weight; more preferably about 0-1%, most preferably, surfactants are employed in amounts of about 0.05-0.25% by weight, based on the total weight of the composition.

The aqueous composition of the present invention can also include additives, such as pigments to provide colors. Suitable pigments include those of the organic type and those of the inorganic type. Preferred organic pigments include D and C Red, Nos. 10, 11, 12 and 13, D and C Red No. 7, D and C Red Nos. 5 and 6, D and C Red Nos. 30 and 40, D and C Yellow No. 5 and D and C Red No. 2. Inorganic pigments include titanium dioxide, bismuth oxychloride, brown iron oxide and the red iron oxides.

The pigments may preferably be employed in amounts of up to about 5% by weight, preferably from about 0.01% to about 5% by weight, more preferably in amounts of from about 0.5% to about 2%, by weight.

Other ingredients may be added to accelerate drying. These include glycol esters, such as butyl glycol acetate, and volatile alcohols such as ethanol and 2-propanol. Drying accelerators may be added in amounts of from of up to about 5%, by weight, more preferably from about 0.01% by weight to about 5% by weight; more preferably from about 0.5% to about 2.5% by weight.

Other ingredients such as plasticizers and coalescing agents may also be employed. These include, for example, those disclosed in U.S. Pat. No. 5,716,603, which patent is hereby incorporated by reference as though set forth in full herein.

Thickeners may also be employed, in amounts in a range of from about 0.01% to about 5% by weight, for example. Suitable thickeners include cellulose and derivatives, including carboxymethylcellulose and hydroxyethyl cellulose, natural gums such as carrageenan, pectin and xanthan gum, silicates, clays, such as laponite and synthetic polymers such as ethylene oxide, vinyl alcohol, acrylic or polyurethane-type polymers, and the like.

Common practice has been to add fillers to the coatings to give properties of face durability, color and fire performance. However, a high amount of fillers (for example, 40% or greater by weight) will typically form a plate-like sealed surface on the board, which is desirable for face durability but will hurt the acoustical properties. They also prevent the coating from soaking into the board, and cause the paint to chip when a cut is made. Fillers also serve to "hide" the color of the substrate (in many compositions, the binder itself will not hide the substrate).

Additives can also be employed. The term "additives" includes a broad range of solid and liquid materials normally added to coating compositions. Suitable additives can be readily identified and employed by those of ordinary skill in the art. Additives include fillers, such as silicas, clays (including Kaolin, Ball, Delaminated, Calcined, etc.); calcium carbonate, titanium dioxide, pigments, optical brighteners, etc. When employed, additives may be employed in amounts in the range of from about 0-40%, based on total weight of the composition.

Suitable acids that can be used in combination with the composition of the present invention include, but are not limited to, at least one acid, preferably fluoacid (e.g., fluotitanic acid, fluozirconic acid, fluosilicic acid, and fluoboric acid). Examples of fluoacid include, but are not limited to, fluotitanic acid, fluozirconic acid, fluosilicic acid and fluoboric acid, preferably fluotitanic acid and fluozirconic acid.

Uses of Composition

As discussed above, the aqueous compositions of the present invention can be used as additives for texture in paint, additives for engineered wood products, adhesives, binders for coating, control porosity of paper and textiles, dimensional stability control for paper, wood and textiles, dye fixative, edge seal extenders for latices, hair styling, ink vehicles, latex replacement/extender, moisture barriers, paint binders, paint primers for all surfaces, paper coating additives, paper printability additives, paper size, paper strength additives (such as wet and dry additives, permanent press resins, porosity control, precoated for coated paper, primer for printing, protective coating, replacement for latex as an internal binder in all applications, sealants, stain resistance, surface modifiers for wood, metals and glass, textile strength, textile wet processing aids, and water resistance/repellency.

The aqueous compositions of the present invention are highly suitable for coating physiological substrates (e.g., nails and hair), porous substrates (e.g., wood and paper), cellulose substrates, textiles, and building materials (e.g., ceiling tiles, wall boards, sheet rocks, metals and the like).

The coating compositions of the present invention provide scratch, water and stain resistance, as well as other properties, such as maintaining flexibility, providing cuttability, durability, desired finished color, and resistance to aqueous liquids.

The aqueous composition of the present invention can also be used in dye fixatives, adhesives, sealants, cellulosic products to provide strength and/or texture. Examples of cellulosic products include, but are not limited to, ceiling tiles, paper products, non-woven products such as sheets, and paint. Non-woven products such as sheets can be natural are synthetic. Examples of non-woven products such as sheets include, but are not limited to, disposable diapers disposable medical products, and absorbent pads.

The cellulosic product of the present invention preferably comprises a cured composition comprising components (A), (B) and (C) in the amount of up to about 10% dry weight, more preferably about 0.005% to about 2% dry weight.

The ceiling tile of the present invention preferably comprises a cured composition comprising components (A), (B) and (C) in the amount of up to about 20% dry weight, more preferably about 0.005% to about 2% dry weight.

The non-woven product of the present invention preferably comprises a cured composition comprising components (A), (B) and (C) in the amount of up to about 20% dry weight, more preferably about 0.005% to about 15% dry weight.

The paint product of the present invention preferably comprises a cured composition comprising components (A), (B) and (C) in the amount of up to about 25% dry weight, more preferably up to about 20% dry weight.

Uses of Composition in Oriented Strand Board

The aqueous composition of the present invention can also be used in oriented strand board (OSB). "Oriented strand board" refers to a composite wood product based upon the use of special forms of wood flakes. Flake is a long, flat piece of wood that is about 1 to 4 inches (about 25-100 mm) in length. The length is in the longitudinal (grain) direction; the thickness is 0.010-0.040 inches (0.25-1.00 mm); and the width is variable. A flake has a length to thickness ratio of at least about 100.

OSB is produced by mixing dried flakes, or strands with resin adhesive, wax and other additives, and then forming the strands into mats on a wide screen caul. The strands are oriented in specific directions. The mat is then pressed, at temperatures up to about 218° C. (See Kirk-Othmer, Encyclopedia at Chemical Technology, Fourth Edition, Supplement Volume, J. Wiley ad Sons, (New York, 1998, pp 803-807).)

OSB is a reconstituted wood product. It provides a lower cost alternative to plywood and solid sawn wood and can be produced in a wide range of densities.

Preferably, the composition used in oriented strand boards is an emulsion and has a ratio of components (A) and (B) to component (C) preferably from about 1:99 to about 99: 1, more preferably from about 80:20 to about 10:90, and most preferably from about 60:40 to about 30:70.

The pH of the emulsion used in oriented strand boards is at least about 4, preferably at least about 7.5, more preferably from about 8.8 to 11.5, and most preferably about 10.2.

Cellulosic products

As used herein, "cellulosic products" is intended to refer to products containing cellulosic fibers, such as paper, paper board, cardboard and any related product. The following discussion concerning paper is illustrative and applies to all related materials and processes.

Paper is made by a process that includes preparing a paper making pulp or slurry, followed by forming the pulp or slurry into a membrane from which the paper sheet is eventually formed. The wet part (as this term is used herein) of the process includes all the stages in furnish preparation, including pulp blending and refining, through thick stock and thin stock blending, chemical additions and dilutions with both white water and fresh incoming water, to the point of deposition of fiber and membrane formation on the wire, at the wet end of the paper making process. Thus, the wet part of the process includes all stages of the paper making process through the formation of the sheet.

In the papermaking industry, it is common to attempt to optimize papermaking compositions in order to provide specific functional properties as efficiently and economically as possible. Such optimization can include the addition of compounds to any part of the wet portion of the process, as well as to any other portion of the process, including the formed or forming pulp as well as formed or forming paper. Typical compositions include (internal and external) sizing agents (materials) and wet and/or dry strength resins. As used herein, internal sizing refers to sizing associated with the addition of size at the wet part of the paper making process, and thus internal sizing or sizing at the wet part of the paper making process refers to the addition of size at any of the stages of the wet part of the process. Surface sizing refers to the addition of materials to the formed or forming pulp as well as formed or forming paper.

Wet and/or dry strength resins are some common additives to papermaking compositions. These materials act to provide strength to wet paper and are used in, among other paper products, paper towel and packaging. Among other uses, they are also useful as creping adhesives. Wet strength resins may be added during paper production to bind the cellulose fibers together, and to enhance the strength of the paper produced so that the paper does not fall apart when used under wet conditions. Wet and dry strength resins may be added during any part of the papermaking process including the wet part or may be added to formed pulp and formed paper.

Use of Composition as Coating for Ceiling Tiles

The coating of the present invention is highly suitable for ceiling boards (ceiling tiles), since the coating gives the coated board an improved face durability and cuttability, and provides water resistance. Although the coating can be used on a ceiling board of any suitable composition, the boards for which the present coating compositions have been found to be suitable comprise fiber in an amount in the range of from about 5 to about 85% by weight, filler in an amount in the range of from about 5 to about 90% by weight, and a binder in an amount in the range of from about 1 to about 25% by weight. Preferably, the board is an acoustical board comprising fiber in an amount in the range of from about 20% to about 80% by weight, filler in an amount in the range of from about 20 to about 75% by weight, and a binder in an amount in the range of from about 1 to about 20% by weight. In one preferred embodiment, the acoustical board comprises from about 10 to about 80% by weight of a fiber selected from at least one of mineral wool and cellulosic fibers, a filler at an amount in the range of from about 5 to about 90% by weight, said filler being selected from the group consisting of perlite and clay, and an organic binder at an amount in the range of from about 1 to about 20% by weight.

Some suitable acoustical boards which can be coated with the compositions described herein are described in and can be prepared in accordance with procedures described in U.S. Pat. No. 4,963,603 to FELEGI et al., assigned to Armstrong World Industries, Inc., which patent is hereby incorporated by reference as though set forth in full herein.

Coatings that produce an "I beam" effect with such board are provided in accordance with preferred embodiments of the present invention. The invention provides a surface treatment to the board to make the surface strong, but also pliable when the board is cut. In certain preferred embodiments, the "I beam" effect results from configurations wherein each major surface of the board, such as two faces, are coated with a composition of the invention, leaving uncoated porous board material, such as that described above, therebetween.

While ceiling tile and wallboard material are typical of the building materials contemplated herein, these materials are considered to be representative of one type of substrate which is suitable to be coated by the compositions of the invention. Therefore, for ease of discussion, reference is made herein to ceiling tile, and in particular, acoustical ceiling tile; however, it will be readily understood that other substrates are similar, and all such materials are intended to be within the scope of the present invention.

Metal Conversion Coatings

Although metal conversion coatings are generally known in the art, traditional chromate coatings have become uneconomical due to increased costs associated with industrial pollution concerns.

The compositions of the present invention are very suitable for use as chromium-free conversion coatings for metal surfaces, for example to improve corrosion resistance and adhesion of later-applied coatings on metals such as steel, galvanized steel, aluminum, zinc-aluminum coated steel and aluminum alloys. Such later-applied coatings can include paints, inks, lacquers, plastics and other siccative coatings. The inventive composition can be applied as an aqueous solution and can be used alone or with additives such as one or more of acetic acid, glycolic acid, and fluoacids such as dihydrohexafluotitanic acid, dihydrohexafluosilicic acid, dihydrohexafluozirconic acid, and fluoboric acid.

The manner of treating a metal surface can include applying an aqueous solution of the composition (e.g., up to about 90% by weight), and drying the composition in place on the surface or rinsing as by a water bath or shower, preferably drying the composition in place on the surface. An acid can beneficially be supplied in the solution to produce a pH of up to about 5. Suitable methods of application include spraying, immersion, flow coating, roll coating, and the like.

Corrosion resistance of the coated metals can be measured using the "Neutral Salt Spray" test; peel resistance can be measured by the "T-Bend" test, "Reverse Impact" test, or "Cross-Hatch" test. The MEK (methyl ethyl ketone) rub test is used to determine whether a paint has properly cured on a metal surface. These tests are detailed hereafter in the Example section.

Use of Composition as Coating for Porous Substrates

The coating compositions of the present invention are particularly suitable for porous substrates. This is especially the case in applications where it is desired to coat a porous substrate without substantially reducing the porosity of the substrate.

The coatings of the invention have particular utility in coating substrates having a porosity of at least about 50-95%, preferably about 85%-90%, based on the amount of air voids. Thus, for a substrate having a porosity of 90%, 90% of the substrate volume is made up of air holes while 10% is solid components. Preferably such substrates are open-celled.

Preferably, the compositions of the invention reduce the porosity of the substrate upon coating and curing by less than about 10%, more preferably less than about 5%, more preferably, less than about 2%, and most preferably less than about 0.5%.

Reduction in porosity can be measured by running an NRC test (described in the test section (Reverberation Room Sound Absorption Test) below) and determining the change after a coating of the invention has been applied to a substrate and cured. Using this test, the compositions of the invention should not change the rounded NRC number of substrates coated with compositions of the invention and cured, by more than about 15, in comparison with the uncoated substrate.

Durability

It has been unexpectedly discovered that compositions of the present invention achieve improved face durability while adding little or no fillers, such as the additives discussed above to the coating. As used herein, the term "little or no fillers" is intended to include compositions having less than about 15% fillers, more preferably, less than about 1%, based on the total weight of the composition. Ideally, the compositions of the invention have substantially no fillers. Since little or no fillers are added, the viscosity of the coating remains low and thus the coating is allowed to penetrate and soak into the board. This effect has been observed in accordance with the present invention to be more of a thin and diluted coating, instead of a formed, "plated" coating. In other words, coatings of the invention penetrate porous structures rather than "plating" across the surface, such as by plating across openings. This keeps the "openness" of the surface of the board intact and does not diminish the acoustical properties of the substrate (or ceiling tile). The coating also gives enough "hiding power" to cover the color of the substrate upon subsequent application of a finish coating, such as a paint, even with little or no fillers. Thus, preferably, the coating may be clear in color, not significantly affect acoustics upon curing, but still provide enough of a coating effect so that subsequently applied coatings of, for example, paints so that the paint can cover and hide the color of the substrate.

Viscosity

Coating compositions of the invention preferably have a relatively low viscosity. In preferred embodiments, coating compositions of the invention have a viscosity of 100 cps or less, preferably 50 cps, or less and most preferably 35 cps or less, as measured on a Brookfield viscosimeter using a No. 2 spindle, at a temperature of 25° C. and spindle speed of about 60 rpm.

Advantages

The unexpectedly superior spectrum of properties provided by the compositions of the invention is more favorable than that which would be expected to be supplied by each component, separately, particularly in view of the fact that the resultant composition exhibits positive aspects of each the components, while certain negative aspects that would be expected by the use of each component, separately, are not exhibited.

In developing the invention, different compositions were attempted, including compositions of component (A) such as polyamidoamine-based compositions (without being combined with a copolymer of an alkyl chloride and a polyalkene); and including compositions of component (B), such as those based on emulsions of copolymers of alkyl chloride and polyalkene (without being combined with a polyamidoamide); and component (C).

In particular, in experiments involving treating building material substrates with compositions comprising components (A) or (B) it was found that compositions based on emulsions of copolymers of alkyl chloride and alkenes, such as copolymers of vinyl chloride and ethylene, provided very good cuttability and no flaking or chipping; however, these compositions did not achieve the desired finished color in ceiling tile application (for example, there was no holdout from the primecoat, i.e., they did not hide the color of the substrate). Similarly, polyamidoamine-based compositions provided very good scratch durability and finish color, but provided poor results with regard to cutting or flaking. It was expected that these negative or poor aspects of the individual components would be retained by the combined composition. However, contrary to expectations, these poor aspects were not exhibited, but the desirable aspects were retained.

Primer Coatings

The compositions of the invention have particular utility as a primer coating, such as coatings which are applied to a newly-manufactured substrate. The primer coated substrates can then later be painted or further coated, either prior to or subsequent to installation.

Application of Composition

The compositions of the invention may be applied to substrates in any suitable way, such as by coating equipment, including spraying, brushing, roller application, and the like. Those of ordinary skill in the art can readily select a suitable application system. For building materials in general and ceiling tile in particular, the substrates may preferably be coated by spraying. Compositions of the invention may be applied in any amount suitable for the particular application. For ceiling tile, amounts in a range of from about 5 to about 50 grams of composition/square foot are suitable, preferably amounts of from about 10 to about 40 g/square foot, more preferably about 15 to about 25 g/square foot. 20 grams of coating composition per square foot of substrate has been found to be particularly suitable amount of application in accordance with the invention.

After application to the substrate, compositions of the invention may be preferably subjected to accelerated drying and curing. Any suitable drying arrangement may be employed to cure the coating. The only requirement is that the water be driven off so that curing takes place. The coated substrate may be dried in a drying oven at a temperature in the range of about 350° F. to about 460° F., preferably about 350° F. to about 450° F. A temperature of about 450° F. has been found to be particularly suitable. Alternatives such as heat lamps without the use of specialized drying ovens may be employed alternatively, or in addition thereto.

The compositions of the invention exhibit stability over time. Thus, the compositions of the invention do not gel when stored at room temperature (20° C.) in a closed, sealed container for a period of at least about 2 weeks; preferably at least about 1 month.

Without further elaboration, it is believed that one skilled in the art can, using the preceding description, utilize the present invention to its fullest extent.

The following preferred specific embodiments are, therefore, to be construed as merely illustrative, and not limitative of the remainder of the disclosure in any way whatsoever. In the following examples, all temperatures are set forth uncorrected in degrees Fahrenheit; unless otherwise indicated, all parts and percentages are by weight.

EXAMPLES

The following experiments are conducted in an effort to (1) improve the characteristics of building materials, in particular, resistance to water penetration; (2) improve properties of oriented strand board; (3) improve binding and adhesive strength properties of paper coatings; (4) test efficacy of different latices that could be used in the composition of the present invention; and (5) improve metal coatings. Test procedures for all tests referenced in this specification are also set forth following the report of the resultant data, at the end of the following Examples.

Example 1

Formulations

In this example, Samples 1-10 are prepared using Kymene, Airflex, and Hercon. The amount of each ingredient used is recited in Table 1 below. The Samples are prepared as follows:

A one liter of emulsion is prepared by adding KYMENE® 557H wet strength resin (obtained from Hercules Incorporated, Wilmington, Del.) to AIRFLEX® 4530 (obtained from Air Product and Chemicals, Inc., Allentown, Pa.) with mechanical stirring. 62.5 g of demineralized water is added to the emulsion to yield a slightly blue opaque white dispersion. The dispersion is then allowed to stir for 15 minutes at room temperature.

Hercon® 70 sizing emulsion (obtained from Hercules Incorporated, Wilmington, Del.) is then added to the dispersion to yield an opaque white dispersion with the ratios recited in Table 2 for each sample of wet KYMENE® 557H and AIRFLEX® 4530 to of wet Hercon® 70 sizing emulsion.

The final product has a total solids of 13.6%, pH of 4.5 to 5.0, and a Brookfield viscosity of 28 centipoise at 25° C. (The Brookfield viscosity is measured using the Brookfield programmable LV DV-II +Viscometer Spindle #2, at 60 rpm and 25° C.)

Application and General Observations for Ceiling Tiles

A 20-g aliquot of the emulsion of each sample of Samples 1 to 10 is absorbed onto a 4-inch by ½-inch paint roller and applied to 10 ceiling tiles at the rate of 0.046 pounds per square meter.

A 20-g aliquot of Hercon® 70 sizing emulsion is absorbed onto a 4-inch by ½-inch paint roller and applied to 1 ceiling tile at the rate of 0.046 pounds per square meter (Sample 11 shown in Table 2 below).

A 20-g aliquot of Ketene® 557H and AIRFLEX® 4530 emulsion is absorbed onto a 4-inch by ½-inch paint roller and applied to 1 ceiling tile at the rate of 0.046 pounds per square meter (Sample 12 shown in Table 2 below).

The tiles are cured for five minutes at 150° C. Flow and characteristics of the coated ceiling tiles are observed and recorded as shown in Table 2 below.

The ceiling tiles are further tested for water repellency by applying a single measured drop of demineralized water to the surface of the substrate. The tiles are observed and recorded as shown in Table 2 below.

TABLE 1

| Sample | Amount (dry g) Kymene ® 557H | Amount (dry g) Airflex ® 4530 | Amount (dry g) Hercon ® 70 |
|---|---|---|---|
| 1 | 58 | 34 | 8 |
| 2 | 52 | 31 | 17 |
| 3 | 46 | 28 | 26 |
| 4 | 40 | 24 | 36 |
| 5 | 34 | 20 | 46 |
| 6 | 31 | 18 | 51 |
| 7 | 28 | 16 | 56 |
| 8 | 21 | 13 | 66 |
| 9 | 14 | 9 | 77 |
| 10 | 8 | 4 | 88 |
| 11 | 0 | 0 | 11 |
| 12 | 63 | 37 | 0 |

TABLE 2

| SAMPLE | Ketene & Airflex/Hercon | | Viscosity (cps) at 25° C.[a] | Flow Characteristics | | Water Drop Absorption |
|---|---|---|---|---|---|---|
| | | | | Contact Angle | Absorption | Time (hours) |
| 1 | 90 | 10 | 20.0 | Flat (low) | Good | 4 |
| 2 | 80 | 20 | 23.0 | ↓ | ↓ | 5 |
| 3 | 70 | 30 | 24.0 | | | >8 |
| 4 | 60 | 40 | 24.0 | ↓ | ↓ | >8 |
| 5 | 50 | 50 | 22.5 | | | >8 |
| 6 | 45 | 55 | 16.5 | Very sharp (very high) | Excellent | >8 |
| 7 | 40 | 60 | 16.5 | ↓ | ↓ | >8 |
| 8 | 30 | 70 | 16.0 | | | >8 |
| 9 | 20 | 80 | 16.0 | ↓ | ↓ | >8 |
| 10 | 10 | 90 | 16.0 | Flat | Poor | >8 |
| 11 (Control) | Hercon 70 | | 17.5 | Sharp (high) | Poor | >8 |
| 12 (Control) | Kymene ® 557H and Airflex ® 4530 | | 13.5 | *None | Good | $2.22 \times 10^{-3}$ (8 sec.) |

*Absorption of water drop occurred quickly indicating very little repellency and no contact angle
Brookfield viscosity
Brookfield programmable
Model LV DV-II + Viscometer
Spindle #2 60 rpm 25° C.

As shown in Table 2, the flow characteristics and absorption for Sample 1 are "good" and are increasingly "good" through Sample 6. ("Good" herein means that the emulsion evenly covers the substrate, and is promptly absorbed into the substrate.) The flow characteristics and absorption levels off at Sample 7, and decreases in quality through Sample 11 (which is a control sample and coated with Hercon® 70). Sample 10 displays the worst absorption and flow characteristics.

Table 2 also shows that the contact angle of Sample 1 is very low (flat). The contact angle increases (to very sharp) from Sample 1 through Sample 6, and then decreases from Sample 7 to flat for Sample 10. Sample 11 (which is the control sample and coated with Hercon® 70) yields a high (sharp) contact angle while Sample 12 (which is coated with KYMENE® 557H and AIRFLEX® 4530) yields no contact angle due to lack of water repellency. The water drop is then observed for contact angle and time of total penetration into the substrate. The water drop time of penetration is 4 hours for Sample 1, 5 hours for Sample 2, over 8 hours for Sample 3-11, and 8 seconds for Sample 12.

Example 2

Application and General Observations for OSB

This example is directed to Samples 1-6 in Table 3 below. Specifically, this example illustrates the percentage of edge swell of oriented strand board of Samples 1-6.

Six 3-inch wide and 6-inch long cut boards (Samples 1-6 as shown in Table 3) are used in this Example. The cut boards are measured with a caliper at three locations on the long edge of the blocks and at the center of the blocks. Each measurement is marked on the boards. Five of the boards (Samples 2-6 as shown in Table 3) are treated with five different emulsions as follows which are prepared as shown below.

Sample 1 is a control sample (Control Sample 1) that receives no treatment. Sample 2 is a control sample (Control Sample 2) that is treated with 20 dry g aliquot of Hercon® 70 sizing emulsion (obtained from Hercules Incorporated, Wilmington, Del.).

Example 3 is prepared as follows:

One liter of emulsion is prepared by adding 42.2 dry g of KYMENE® 557H wet strength resin (obtained from Hercules Incorporated, Wilmington, Del.) to 25 dry g of Airflex® 4530 with mechanical stirring. 62.5 g of demineralized water is added to the emulsion to yield a slightly blue opaque white dispersion. The dispersion is then allowed to stir for 15 minutes at room temperature. 68.75 dry g aliquot of Hercon® 70 sizing emulsion (obtained from Hercules Incorporated, Wilmington, Del.) is then added to the dispersion to yield an opaque white dispersion with a ratio of 45 parts of wet KYMENE® 557H and AIRFLEX® 4530 to 55 parts of wet Hercon® 70 sizing emulsion.

The final product has a total solids of 13.6%, pH of 4.5 to 5.0, and a Brookfield viscosity of 28 centipoise at 25° C. (The Brookfield viscosity is measured using the Brookfield programmable LV DV-II +Viscometer Spindle #2, at 60 rpm and 25° C.)

Each one of Samples 4-6 is prepared using the same procedure as Sample 3 with the exception that each sample is adjusted to yield the pH recited in Table 3.

Application and General Observations for Oriented Strand Board

Six sponges, each at least 7-inches long, are used in this Example. Each of the six sponges is placed into a tray containing enough water to saturate the sponge but not cover it. Each sample (board) of Samples 1-6 is placed on each sponge with the long edge down (which is the edge that is measured and marked as discussed above).

The boards are observed and measured at the same location originally marked at 24, 48, and 72 hours. The results are recorded in Table 3 below.

TABLE 3

PERCENT OF EDGE SWELL

| SAMPLE | % Edge Swell after 24 Hrs | % Edge Swell after 72 Hrs | CONDITION |
|---|---|---|---|
| Sample 1 (Control 1) | 6.7 | 11.6 | No treatment |
| Sample 2 (Control 2) | 2.0 | 6.4 | Hercon ® 70 (AKD) |
| Sample 3 | 5.9 | 7.4 | Kymene ® 557H, Airflex ® 4530, and Hercon ® 70 (prepared at pH 4.5-5.0) |
| Sample 4 | 3.3 | 5.0 | Kymene ® 557H, Airflex ® 4530, and Hercon ® 70 (pH adjusted to 8.8) |
| Sample 5 | 1.7 | 3.8 | Kymene ® 557H, Airflex ® 4530, and Hercon ® 70 (pH adjusted to 10.2) |
| Sample 6 | 2.3 | 4.6 | Kymene ® 557H, Airflex ® 4530, and Hercon ® 70 (pH adjusted to 11.5) |

Table 3 illustrates that after 24 hours and after 72 hours, the board pieces with treatment (Samples 3-6) yield lower percentage of edge swell than the board with no treatment (Sample 1). After 24 hours, Sample 5 yields a lower percentage of edge swell then Sample 2 (which yields a lower percentage of edge swell then Samples 3, 4, and 6). After 72 hours, Samples 4, 5, and 6 yield lower percentage of edge swell than Control Samples 1 and 2.

In addition, after 24 hours, the boards treated with compositions containing Kymene® 557H, Airflex® 4530, and Hercon® 70 (Samples 4-6) yield lower percentage of edge swell than the board that received no treatment (Control Sample 1) but higher than the board treated with Hercon only (Control Sample 2).

After 24 hours and after 72 hours, the boards containing compositions containing Kymene® 557H, Airflex® 4530, and Hercon® 70 having pH of at least 8.8 (Samples 4-6) yield reduced percentage of edge swell when compared with the board containing Kymene® 557H, Airflex® 4530, and Hercon® 70 having pH of 4.5 to 5.0 (Sample 3).

Example 3

Application and General Observations for Use as a Conversion Coating for metal

This example is directed to Samples 1-7 below and illustrates Neutral Salt Spray (NSS) performance and physical durability of painted metal panels.

Sample 1 is prepared as follows:

0.75 wt. % of a composition containing Kymene, Airflex, and Hercon (prepared as described in Example 1 above for Samples 1-10.) is added to 0.43 wt.% of fluozirconic acid.

Samples 2-4 are prepared as follows:

Samples 2-4 are prepared using the same procedure as described in Sample 1 above with the exception that 3.7 wt. %, 7.5 wt. %, and 37 wt. % are used respectively.

Samples 5-7:

Sample 5 contains 0.43 weight %. by volume of fluozirconic acid.

Sample 6 contains 15% by volume of Permatreat 1021B which is a chrome no-rinse treatment obtained from BetzDearbom.

Sample 7 contains 10% by volume of Permatreat 1500 which is a non-chrome treatment obtained from BetzDearborn.

Hot-dipped galvanized metal panels are obtained from ACT and cleaned with BetzDearbom KL4010, a commercial alkaline cleaner available from BetzDearborn. The metal panels are rinsed with deionized water for 5 seconds, and subsequently coated with Samples 1-7 by spin coat application, followed by forced air drying. Duplicate panels are coated for each sample.

The treated panels are painted with two one-coat paints typically used in coil applications, available from PPG and Specialty. The paint is applied and cured according to the manufacturers specifications.

The coated metal panels then undergo NSS testing, T-Bend, Cross-Hatch, Reverse Impact, and methyl ethyl ketone (MEK) double rub testing. The metal panels are observed and the results are shown in Tables 4 (NSS) and 5 (other test data) for the PPG paint, and Tables 6 and 7 for the Specialty paint.

Neutral salt spray results are reported in Table 4 as scribe, field. In addition, Table 4 recites "/" for results of duplicated metal panels coated with each sample. Results are for duplicate panels and are rated as per ASTM D-1654 (with 10 being perfect); T-Bend data describes the tendency for paint to disadhere from a 180° bend in the metal measured according to ASTM D4145-83 (wherein 0T is perfect); Cross-Hatch data describes the tendency to disadhere from areas between closely spaced lines through the paint. The test was done dry according to ASTM D3359 (from a 0B to 5B scale, wherein 5B is perfect); Reverse Impact data describes the tendency of paint to disadhere from metal deformed by an impact of known momentum on the reverse side of the test surface according to ASTM D2794; MEK rub data describe whether the paint is cured properly and is described in National Coil Coaters' Association (NCCA) Method II-18.

TABLE 4

| | 72 hrs. | | 168 hrs. | | 240 hrs. | | 336 hrs. | | 500 hr. | |
|---|---|---|---|---|---|---|---|---|---|---|
| Sample | Scribe | Field | Scribe | Field | Scribe | Field | Scribe | Field | Scribe | Field |
| Sample 1 | 7 | 9 | 6 | 8 | 5 | 8 | 3 | 8 | 3/3 | 8/8 |
| Sample 2 | 7 | 9 | 6 | 8 | 4 | 7 | 0 | — | — | — |
| Sample 3 | 7 | 9 | 5 | 8 | 3 | 8 | 2 | — | — | — |

TABLE 4-continued

| Sample | 72 hrs. Scribe | 72 hrs. Field | 168 hrs. Scribe | 168 hrs. Field | 240 hrs. Scribe | 240 hrs. Field | 336 hrs. Scribe | 336 hrs. Field | 500 hr. Scribe | 500 hr. Field |
|---|---|---|---|---|---|---|---|---|---|---|
| Sample 4 | 7 | 8 | 6 | 8 | 5 | 6 | 4 | 4 | 3/3 | 4/4 |
| Sample 5 | 7 | 9 | 5 | 8 | 5 | 8 | 4 | 4 | 2/2 | 6/6 |
| Sample 6 | 8 | 9 | 7 | 9 | 5 | 9 | 5 | 8 | 3/4 | 9/8 |
| Sample 7 | 9 | 10 | 9 | 9 | 9 | 9 | 8 | 9 | 7/7 | 9/9 |

Rankings designated #/# are for duplicate panels. "—" denotes a ranking of below 2.

TABLE 5

Physical testing data for hot-dipped galvanized painted panels with a one coat black PPG polyester.

| Sample | T-Bend (ASTM D4145-83) | Cross-Hatch Test (ASTM D3359) | Reverse Impace Test (in./lbs., ASTM D2794) | MEK Double Rubs Test (NCCA II-18) |
|---|---|---|---|---|
| Sample 1 | 2T | 5B | 160 | 75 |
| Sample 2 | 0T | 5B | 160 | 100+ |
| Sample 3 | 0T | 5B | 160 | 100+ |
| Sample 4 | 0T | 5B | 160 | 100+ |
| Sample 5 | 2T | 5B | 160 | 44 |
| Sample 6 | 0T | 5B | 160 | 100+ |
| Sample 7 | 0T | 5B | 160 | 100+ |

Test methods are as per the ASTM or NCCA standards noted.

TABLE 6

Neutral salt spray (NSS) ratings as per ASTM D1654 for hot-dipped galvanized panels painted with a white Specialty polyester paint.

| Sample | 240 hr. Scribe | 240 hr. Field | 500 hr. Scribe | 500 hr. Field |
|---|---|---|---|---|
| Sample 1 | 8/0 | 9/0 | — | — |
| Sample 2 | 8/9 | 2/2 | — | — |
| Sample 3 | 9/9 | 2/2 | — | — |
| Sample 4 | 8/8 | 4/5 | — | — |
| Sample 5 | — | — | — | — |
| Sample 6 | 9 | 8 | 8 | 5 |
| Sample 7 | 10 | 9 | 10 | 9 |

Rankings designated #/# are for duplicate panels. "—" denotes a ranking of below 2.

TABLE 7

Physical testing data for D-1028/fluoziconic acid treatments painted with a Specialty polyester.

| Sample | T-Bend (ASTM D4145-83) | Cross-Hatch Test (ASTM D3359) | Reverse Impact Test (in./lbs., ASTM D2794) | MEK Double Rubs Test (NCCA II-18) |
|---|---|---|---|---|
| Sample 1 | 2T | 5B | 160 | 50+ |
| Sample 2 | 2T | 5B | 160 | 50+ |
| Sample 3 | 2T | 5B | 160 | 50+ |
| Sample 4 | 3T | 5B | 160 | 50+ |
| Sample 5 | — | — | 160 | 50+ |
| Sample 6 | 1T | 5B | 160 | 50+ |
| Sample 7 | 0T | 5B | 160 | 50+ |

Test methods are as per the ASTM or NCCA standards noted.

What is claimed is:

1. An aqueous composition comprising:
   (A) at least one water-soluble component comprising at least one functional group that undergoes a crosslinking reaction;
   (B) at least one film-forming polymer; and
   (C) at least one component which provides at least one of moisture barrier properties and/or vapor barrier properties greater than that provided by a combination of components (A) and (B) alone.

2. The composition of claim 1 wherein component (A) comprises at least one of acrylamide-based crosslinkable polymers, polyamidoamine-epihalohydrin resins, polyamines, or polyimines.

3. The composition of claim 2 wherein component (A) comprises acrylamide-based crosslinkable polymers.

4. The composition of claim 3 wherein component (A) comprises cationic functionalized polyacrylamides.

5. The composition of claim 2 wherein the functional group of component (A) comprises at least one of epoxy, azetidinium, aldehyde, carboxyl group, acrylate and derivatives thereof, acrylamide and derivatives thereof, or quaternary amine.

6. The composition of claim 5 wherein the functional group of component (A) comprises at least one of epoxy or azetidinium.

7. The composition of claim 2 wherein the film-forming polymer comprises at least one polymer derived from at least one monomer comprising at least one of styrene, dimethylstyrene, vinyltoluene, chloroprene, butadiene, ethylene, acrylamide, acrylonitrile, acrolein, methylacrylate, ethylacrylate, acrylic acid, methacrylic acid, methyl methacrylate, n-butyl acrylate, vinylidene chloride, vinyl ester, vinyl chloride, vinyl acetate, acrylated urethane, hydroxyethyl acrylate, dimethylaminoethyleneacrylate, or vinyl acetate.

8. The composition of claim 2 wherein the film-forming polymer comprises a latex comprising at least one polymer derived from at least one monomer comprising repeating units derived from an alkyl halide having at least one double bond and an alkene, wherein the alkyl halide has from 2 to 12 C atoms, and wherein the alkene has from 2 to 12 C atoms.

9. The composition of claim 8 wherein the alkyl halide comprises a vinyl halide.

10. The composition of claim 9 wherein the alkyl halide comprises a vinyl halide and the alkene comprises an olefin.

11. The composition of claim 2 wherein component (C) comprises one of sizing materials, ketene dimers, alkenyl succinic anhydrides, fatty acids, or wax emulsions.

12. The composition of claim 11 wherein the sizing material is a ketene dimer compound prepared from fatty acids of from 16 to 22 C atoms.

13. The composition of claim 11 wherein the wax emulsion comprises at least one of slack or microcrystalline wax.

14. The composition of claim 11 wherein the dry weight ratio of (A) and (B) to (C) is about 99:1 to 1:99.

15. The composition of claim 14 wherein the dry weight ratio of (A) and (B) to (C) is about 60:40 to about 30:70.

16. The composition of claim 11 further comprising a fluoacid.

17. The composition of claim 14 further comprising a fluoacid.

18. A substrate coated with a cured composition of claim 1.

19. A substrate coated with a cured composition of claim 2.

20. A metal substrate coated with a cured composition of claim 16.

21. The metal substrate of claim 20, wherein the fluoacid comprises at least one of fluotitanic acid or fluozirconic acid.

22. The metal substrate of claim 21, wherein the composition has a pH from about 1.5 to about 5.0.

23. A metal substrate coated with a cured composition of claim 17.

24. The metal substrate of claim 23, wherein the fluoacid comprises at least one of fluotitanic acid or fluozirconic acid.

25. The metal substrate of claim 24, wherein the composition has a pH from about 1.5 to about 5.0.

26. A cellulosic product comprising a cured composition of claim 1.

27. A cellulosic product comprising a cured composition of claim 2.

28. A ceiling tile comprising a cured composition of claim 1.

29. A non-woven product comprising a cured composition of claim 1.

30. A latex extender comprising a cured composition of claim 1.

31. A paint comprising a cured composition of claim 1.

32. The composition of claim 7 wherein component (C) comprises one of sizing materials, ketene dimers, alkenyl succinic anhydrides, fatty acids, or wax emulsions.

33. The composition of claim 32 wherein the dry weight ratio of (A) and (B) to (C) is about 99:1 to 1:99.

34. The composition of claim 33, further comprising a fluoacid.

35. A metal substrate coated with a cured composition of claim 34.

36. The metal substrate of claim 35, wherein the fluoacid comprises at least one of fluotitanic acid or fluozirconic acid.

37. The metal substrate of claim 36, wherein the composition has a pH from about 1.5 to about 5.0.

38. A cellulosic product comprising a cured composition of claim 33.

39. A latex extender comprising a cured composition of claim 33.

40. A non-woven product comprising a cured composition of claim 33.

41. A method of preparing a coated substrate which comprises:
(1) coating a substrate with a coating composition comprising:
(A) at least one water-soluble component comprising at least one functional group that undergoes a crosslinking reaction; (B) at least one film-forming polymer; and (C) at least one component which provides at least one of moisture barrier properties and/or vapor barrier properties greater than that provided by a combination of components (A) and (B) alone; and
(2) curing the coating composition on the substrate.

42. The method of claim 41 wherein component (A) comprises at least one of acrylamide-based crosslinkable polymers, polyamidoamine-epihalohydrin resins, polyamines, or polyimines.

43. The method of claim 42 wherein component (A) comprises acrylamide-based crosslinkable polymers.

44. The method of claim 42 wherein component (A) comprises cationic functionalized polyacrylamides.

45. The method of claim 42 wherein the functional group of component (A) comprises at least one of epoxy, azetidinium, aldehyde, carboxyl group, acrylate and derivatives thereof, acrylamide and derivatives thereof, or quaternary amine.

46. The method of claim 45 wherein the functional group of component (A) comprises at least one of epoxy or azetidinium.

47. The method of claim 42 wherein the film-forming polymer comprises at least one polymer derived from at least one monomer comprising at least one of styrene, dimethylstyrene, vinyltoluene, chloroprene, butadiene, ethylene, acrylamide, acrylonitrile, acrolein, methylacrylate, ethylacrylate, acrylic acid, methacrylic acid, methyl methacrylate, n-butyl acrylate, vinylidene chloride, vinyl ester, vinyl chloride, vinyl acetate, acrylated urethane, hydroxyethyl acrylate, dimethylaminoethyleneacrylate, or vinyl acetate.

48. The method of claim 41 wherein the film-forming polymer comprises a latex comprising at least one polymer derived from at least one monomer comprising repeating units derived from an alkyl halide having at least one double bond and an alkene, wherein the alkyl halide has from 2 to 12 C atoms, and wherein the alkene has from 2 to 12 C atoms.

49. The method of claim 48 wherein the alkyl halide comprises a vinyl halide and the alkene comprises an olefin.

50. The method of claim 42 wherein component (C) comprises one of sizing materials, ketene dimers, alkenyl succinic anhydrides, fatty acids, or wax emulsions.

51. The method of claim 50 wherein the sizing material is a ketene dimer compound prepared from fatty acids having $C_{16}$ to $C_{22}$.

52. The method of claim 50 wherein the dry weight ratio of (A) and (B) to (C) is about 99:1 to 1:99.

53. The method of claim 52 wherein the dry weight ratio of (A) and (B) to (C) is about 60:40 to 30:70.

54. The method of claim 50 further comprising a fluoacid.

55. The method of claim 52 further comprising a fluoacid.

56. A metal substrate prepared by the method of claim 54.

57. The metal substrate of claim 56, wherein the fluoacid comprises at least one of fluotitanic acid or fluozirconic acid.

58. The metal substrate of claim 57 wherein the composition has a pH from about 1.5 to about 5.0.

59. A metal substrate prepared by the method of claim 55.

60. The metal substrate of claim 59, wherein the fluoacid comprises at least one of fluotitanic acid and fluozirconic acid.

61. The metal substrate of claim 60, wherein the composition has a pH from about 1.5 to about 5.0.

62. The method of claim 44 wherein the film-forming polymer comprises at least one polymer derived from monomers of alkyl halides of from 2-12 C atoms, alkene halides of from 2-12 C atoms, alkyl acrylamides of from 2-12 C atoms, alkene acrylamides of from 2-12 C atoms, alkyl acrylates of from 2-12 C atoms, or alkene acrylates of from 2-12 C atoms.

63. The method of claim 62 wherein component (C) comprises one of sizing materials, ketene dimers, alkenyl succinic anhydrides, fatty acids, or wax emulsions.

64. A method of preparing cellulosic products which comprises:
   substantially simultaneously or sequentially adding a composition to a system comprising a cellulosic slurry or suspension,
   the composition comprising:
   (A) at least one water-soluble component comprising at least one functional group that undergoes a crosslinking reaction; (B) at least one film-forming polymer; and (C) at least one component which provides at least one of moisture barrier properties and/or vapor barrier properties greater than that provided by a combination of components (A) and (B) alone.

65. The method of claim 64 wherein component (A) comprises at least one of acrylamide-based crosslinkable polymers, polyamidoamine-epihalohydrin resins, polyamines, or polyimines.

66. The method of claim 65 wherein component (A) comprises acrylamide-based crosslinkable polymers.

67. The method of claim 66 wherein component (A) comprises cationic functionalized polyacrylamides.

68. The method of claim 65 wherein the functional group of component (A) comprises at least one of epoxy, azetidinium, aldehyde, carboxyl group, acrylate and derivatives thereof, acrylamide and derivatives thereof, or quaternary amine.

69. The method of claim 68 wherein the functional group of component (A) comprises at least one of epoxy or azetidinium.

70. The method of claim 65 wherein the film-forming polymer comprises at least one polymer derived from at least one monomer comprising at least one of styrene, dimethylstyrene, vinyltoluene, chloroprene, butadiene, ethylene, acrylamide, acrylonitrile, acrolein, methylacrylate, ethylacrylate, acrylic acid, methacrylic acid, methyl methacrylate, n-butyl acrylate, vinylidene chloride, vinyl ester, vinyl chloride, vinyl acetate, acrylated urethane, hydroxyethyl acrylate, dimethylaminoethyleneacrylate, or vinyl acetate.

71. The method of claim 65 wherein the film-forming polymer comprises a latex comprising at least one polymer derived from at least one monomer comprising repeating units derived from an alkyl halide having at least one double bond and an alkene, wherein the alkyl halide has from 2 to 12 C atoms, and wherein the alkene has from 2 to 12 C atoms.

72. The method of claim 71 wherein the alkyl halide comprises a vinyl halide and the alkene comprises an olefin.

73. The method of claim 65 wherein component (C) comprises one of sizing materials, alkenyl succinic anhydrides, fatty acids, or wax emulsions.

74. The method of claim 73 wherein the sizing material is a ketene dimer compound prepared from fatty acids of from 16 to 22 C atoms.

75. The method of claim 73 wherein the dry weight ratio of (A) and (B) to (C) is about 99:1 to 1:99.

76. The method of claim 75 wherein the dry weight ratio of (A) and (B) to (C) is about 60:40 to 30:70.

77. The method of claim 67 wherein the film-forming polymer comprises at least one polymer derived from monomers of alkyl halides of from 2-12 C atoms, alkene halides of from 2-12 C atoms, alkyl acrylamides of from 2-12 C atoms, alkene acrylamides of from 2-12 C atoms, alkyl acrylates of from 2-12 C atoms, or alkene acrylates of from 2-12 C atoms.

78. The method of claim 77 wherein component (C) comprises one of sizing materials, alkenyl succinic anhydrides, fatty acids, or wax emulsions.

79. The method of claim 77 wherein the dry weight ratio of (A) and (B) to (C) is about 60:40 to 30:70.

80. A cellulosic product prepared by the method of claim 79.

81. A ceiling tile prepared by the method of claim 79.

82. A non-woven product prepared by the method of claim 79.

83. A method for forming a substantially chromium-free, dried in place conversion coating on a metal surface comprising applying to a metal surface:
   (1) an aqueous composition comprising (A) at least one water-soluble component comprising at least one functional group that undergoes a crosslinking reaction; (B) at least one film-forming polymer; and (C) at least one component which provides at least one of moisture barrier properties and/or vapor barrier properties greater than that provided by a combination of components (A) and (B) alone; and
   (2) fluoacid,
   wherein the amount of the composition in (1) is from about 0.1 to about 90% by weight, and
   wherein the amount of fluoacid is from about 0.2 to about 20% by weight.

84. The method of claim 83 wherein said coating composition is dried in place on surface of said substrate.

85. The method of claim 83 further comprises rinsing said coating composition from said coated substrate.

86. The method of claim 83, wherein the fluoacid comprises at least one of fluotitanic acid or fluozirconic acid.

87. The method of claim 86, wherein the composition has a pH from about 1.5 to about 5.0.

88. The method of claim 87 wherein component (A) comprises at least one of acrylamide-based crosslinkable polymers, polyamidoamine-epihalohydrin resins, polyamines, or polyimines.

89. The method of claim 88 wherein component (A) comprises acrylamide-based crosslinkable polymers.

90. The method of claim 88 wherein the functional group of component (A) comprises at least one of epoxy, azetidinium, aldehyde, carboxyl group, acrylate and derivatives thereof, acrylamide and modification thereof, or quaternary amine.

91. The method of claim 90 wherein the functional group of component (A) comprises at least one of epoxy or azetidinium.

92. The method of claim 88 wherein the film-forming polymer comprises at least one polymer derived from at least one monomer comprising at least one of styrene, dimethylstyrene, vinyltoluene, chloroprene, butadiene, ethylene, acrylamide, acrylonitrile, acrolein, methylacrylate, ethylacrylate, acrylic acid, methacrylic acid, methyl methacrylate, n-butyl acrylate, vinylidene chloride, vinyl ester, vinyl chloride, vinyl acetate, acrylated urethane, hydroxyethyl acrylate, dimethylaminoethyleneacrylate, or vinyl acetate.

93. The method of claim 86 wherein the film-forming polymer comprises a latex comprising at least one polymer comprising repeating units derived from an alkyl halide having at least one double bond and an alkene, wherein the alkyl halide has from 2 to 12 C atoms, and wherein the alkene has from 2 to 12 C atoms.

94. The method of claim 88 wherein component (C) is a polymer comprising one of sizing materials, alkenyl succinic anhydrides, fatty acids, or wax emulsions.

95. The method of claim 94 wherein the sizing material is a ketene dimer compound prepared from fatty acids of from 16 to 22 C atoms.

96. The method of claim 94 wherein the dry weight ratio of (A) and (B) to (C) is about 99:1 to 1:99.

97. The method of claim 96 wherein the dry weight ratio of (A) and (B) to (C) is about 60:40 to 30:70.

98. A metal substrate prepared by the method of claim 83.

99. A metal substrate prepared by the method of claim 88.

100. A metal substrate coated by the method of claim 93.

101. A metal substrate coated by the method of claim 96.

* * * * *